US008012011B2

(12) United States Patent
Baerlocher et al.

(10) Patent No.: US 8,012,011 B2
(45) Date of Patent: Sep. 6, 2011

(54) GAMING DEVICE AND METHOD HAVING INDEPENDENT REELS AND MULTIPLE WAYS OF WINNING

(75) Inventors: Anthony J. Baerlocher, Reno, NV (US); Paulina Rodgers, Reno, NV (US); Alexander Casey Naglestad Cohen, Reno, NV (US)

(73) Assignee: IGT, Reno, NV (US)

( * ) Notice: Subject to any disclaimer, the term of this patent is extended or adjusted under 35 U.S.C. 154(b) by 834 days.

(21) Appl. No.: 12/045,848

(22) Filed: Mar. 11, 2008

(65) Prior Publication Data

US 2008/0161097 A1 Jul. 3, 2008

Related U.S. Application Data

(63) Continuation of application No. 11/466,010, filed on Aug. 21, 2006.

(60) Provisional application No. 60/711,601, filed on Aug. 26, 2005.

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS 4,198,052 A 4/1980 Gauselmann
4,448,419 A 5/1984 Telnaes
4,695,053 A 9/1987 Vazquez, Jr. et al.
4,838,552 A 6/1989 Hagiwara
4,874,173 A 10/1989 Kishishita
5,085,436 A 2/1992 Bennett
5,102,134 A 4/1992 Smyth
5,102,137 A 4/1992 Ekiert
5,209,479 A 5/1993 Nagao et al.
5,342,047 A 8/1994 Heidel et al.
5,393,061 A 2/1995 Manship et al.
5,569,084 A 10/1996 Nicastro et al.
5,580,053 A 12/1996 Crouch
(Continued)

FOREIGN PATENT DOCUMENTS

DE 25 29 930 12/1976
(Continued)

OTHER PUBLICATIONS

Letter from Mr. McClarnon regarding disclosure of U.S. Patent No. 6,409,602, dated Jul. 15, 2008.

(Continued)

*Primary Examiner* — Ronald Laneau
(74) *Attorney, Agent, or Firm* — K&L Gates LLP

(57) ABSTRACT

A gaming device including a plurality of unisymbol reels which are each selectively activated to generate a symbol at an active symbol position. After a plurality of symbols are generated by the unisymbol reels (wherein the number of generated symbols is based on a wagered on number of ways to win), the gaming device analyzes any associated symbols which are generated in active symbol positions over a requisite number of adjacent reel columns to determine whether the generated symbols form part or all of a winning symbol combination (i.e., a combination of associated or related symbols). The gaming device determines any outcomes associated with any formed winning symbol combinations and provides any determined outcomes to the player, wherein unlike a gaming device with paylines, any outcomes provided to the player are not determined based on the number of paylines which may pass through any displayed winning symbol combinations.

73 Claims, 34 Drawing Sheets

U.S. PATENT DOCUMENTS

| | | | | |
|---|---|---|---|---|
| 5,584,764 | A | 12/1996 | Inoue | |
| 5,609,524 | A | 3/1997 | Inoue | |
| 5,611,535 | A | 3/1997 | Tiberio | |
| 5,697,843 | A | 12/1997 | Manship et al. | |
| 5,704,835 | A | 1/1998 | Dietz, II | |
| 5,722,891 | A | 3/1998 | Inoue | |
| 5,766,074 | A | 6/1998 | Cannon et al. | |
| 5,807,172 | A | 9/1998 | Piechowiak | |
| 5,848,932 | A | 12/1998 | Adams | |
| 5,882,261 | A | 3/1999 | Adams | |
| 5,976,016 | A | 11/1999 | Moody et al. | |
| 5,984,781 | A | 11/1999 | Sunaga | |
| 5,984,782 | A | 11/1999 | Inoue | |
| 6,004,207 | A | 12/1999 | Wilson, Jr. et al. | |
| 6,056,642 | A | 5/2000 | Bennett | |
| 6,089,978 | A | 7/2000 | Adams | |
| 6,093,102 | A | 7/2000 | Bennett | |
| 6,120,378 | A | 9/2000 | Moody | |
| 6,159,096 | A | 12/2000 | Yoseloff | |
| 6,241,607 | B1 | 6/2001 | Payne et al. | |
| 6,358,147 | B1 | 3/2002 | Jaffe et al. | |
| 6,409,602 | B1 | 6/2002 | Wiltshire et al. | |
| 6,413,162 | B1 | 7/2002 | Baerlocher et al. | |
| 6,575,830 | B2 * | 6/2003 | Baerlocher et al. | 463/20 |
| 6,634,945 | B2 | 10/2003 | Glavich et al. | |
| 6,896,617 | B2 | 5/2005 | Daly | |
| 6,960,133 | B1 | 11/2005 | Marks et al. | |
| 7,001,274 | B2 | 2/2006 | Baerlocher et al. | |
| 7,007,953 | B1 | 3/2006 | Calbot | |
| 7,014,560 | B2 | 3/2006 | Glavich et al. | |
| 7,473,173 | B2 * | 1/2009 | Peterson et al. | 463/20 |
| 2002/0039920 | A1 | 4/2002 | Bryant | |
| 2003/0045345 | A1 | 3/2003 | Berman | |
| 2003/0216165 | A1 | 11/2003 | Singer et al. | |
| 2004/0048650 | A1 | 3/2004 | Mierau et al. | |
| 2004/0053677 | A1 | 3/2004 | Hughs-Baird | |
| 2004/0058727 | A1 | 3/2004 | Marks et al. | |
| 2004/0192431 | A1 | 9/2004 | Singer et al. | |
| 2004/0195773 | A1 | 10/2004 | Masci et al. | |
| 2004/0242313 | A1 | 12/2004 | Munoz | |
| 2004/0259628 | A1 | 12/2004 | Randall | |
| 2005/0059478 | A1 | 3/2005 | Peterson et al. | |
| 2005/0148384 | A1 | 7/2005 | Marks et al. | |
| 2005/0170876 | A1 | 8/2005 | Masci et al. | |
| 2005/0192081 | A1 | 9/2005 | Marks et al. | |
| 2005/0277460 | A1 | 12/2005 | Inoue | |
| 2005/0288094 | A1 | 12/2005 | Marks et al. | |
| 2006/0019738 | A1 * | 1/2006 | Baerlocher et al. | 463/20 |
| 2006/0040728 | A1 | 2/2006 | Fuller | |
| 2006/0046830 | A1 | 3/2006 | Webb | |
| 2006/0084492 | A1 | 4/2006 | Baerlocher et al. | |
| 2006/0084493 | A1 | 4/2006 | Pederson et al. | |
| 2007/0060255 | A1 * | 3/2007 | Baerlocher et al. | 463/16 |
| 2009/0088239 | A1 * | 4/2009 | Iddings et al. | 463/20 |

FOREIGN PATENT DOCUMENTS

| | | | |
|---|---|---|---|
| DE | 79 31 812 | | 2/1980 |
| DE | 31 05 266 | | 8/1990 |
| DE | 42 26 873 | | 11/1990 |
| DE | 2 226 907 | | 2/1994 |
| GB | 2106292 | | 4/1983 |
| GB | 2316214 | | 2/1998 |
| JP | 408010383 | A | 1/1996 |
| JP | 410328351 | A | 12/1998 |
| JP | 02001017657 | A | 1/2001 |
| WO | WO 00/20082 | | 4/2000 |
| WO | WO2005/009560 | | 2/2005 |
| WO | WO2005/058444 | | 6/2005 |
| WO | WO2007/084766 | | 7/2007 |

OTHER PUBLICATIONS

Examiner's Report, dated Jun. 11, 2010, from Australian Patent Application No. 2006 203657.

Arcade-History.com listing of Artisocrat gaming device with release dates, printed in Feb. 2006.

Aztec Temple Advertisement, written by IGT, published in 2005.

Aztec Temple MultiWay Article, written by Strictly Slots, published in Aug. 2005.

Black rhino game description, printed from Arcade-History.com in Feb. 2006.

Carnival of Mystery Advertisement, written by IGT, published in 2005.

Dolphin Treasure Advertisement, written by Aristocrat, published in Jul. 1993.

Fey, Marshall, Slot machines—A Pictorial History of the First 100 Years, 1997, Liberty Bell Books, 5$^{th}$ Ed.

Golden Canaries game description, printed from Aracde-History.com in Feb. 2006.

Jolly Joke game specification, written by Barcrest, published in Jul. 1993.

Pictures of various co-IGT and Artistocrat gaming devices, available prior to 2005.

Response to Dec. 2003 Final Office Action for U.S. Published Patent Application No. 2002/0039930.

Slot Machines Article written by Reno-Tahoe Specialty, Inc. published in 1989.

Summary Judgment Order from *Aristocrat Technologies Australia Pty Limited* v. *International Game* Technology, 2:05-CV-00820-BES (LRL), dated Apr. 20, 2007.

Super 8 Line Game (and Description) written by IGT, available prior to 2000.

Sweet Hearts II game description, printed from Arcade-History.com in Feb. 2006.

The iGame Series Brochure written by IGT, available prior to 2000.

Turbo Reel Article (with translation), written by Automaten Magazine, published in Dec. 1989.

Turbo Reel Article, written by Automaten Magazine, published in Jan. 1990.

Wizard Ways game description, printed from Arcade-History.com in Feb. 2006.

* cited by examiner

FIG. 3A

| Credits Wager | Ways to Win |
|---|---|
| 1 | 3 |
| 2 | 6 |
| 3 | 9 |
| 4 | 12 |
| 5 | 15 |
| 6 | 18 |
| 7 | 27 |

FIG. 3B

| Combination | Payout |
|---|---|
| Two Cherry Symbols | 1 |
| Three Cherry Symbols | 2 |
| Two Money Bag Symbols | 1 |
| Three Money Bag Symbols | 3 |
| Two Orange Symbols | 1 |
| Three Orange Symbols | 4 |
| Two Seven Symbols | 2 |
| Three Seven Symbols | 5 |
| Two Bar Symbols | 2 |
| Three Bar Symbols | 6 |

FIG. 3C

| | | |
|---|---|---|
| Reel 1, Symbol Position A | Reel 2, Symbol Position A | Reel 3, Symbol Position A |
| Reel 1, Symbol Position B | Reel 2, Symbol Position B | Reel 3, Symbol Position B |
| Reel 1, Symbol Position C | Reel 2, Symbol Position C | Reel 3, Symbol Position C |

FIG. 3D

| | **Reel 1** | **Reel 2** | **Reel 3** |
|---|---|---|---|
| Cherry Symbols | 4 | 7 | 5 |
| Money Bag Symbols | 4 | 5 | 5 |
| Orange Symbols | 3 | 5 | 3 |
| Seven Symbols | 4 | 2 | 4 |
| Bar Symbol | 5 | 1 | 3 |
| TOTAL | 20 | 20 | 20 |

FIG. 3E

| Combination | Hits | Payout | Exp. Payout |
|---|---|---|---|
| Two Cherry Symbols | 420 | 1 | 420 |
| Three Cherry Symbols | 140 | 2 | 280 |
| Two Money Bag Symbols | 300 | 1 | 300 |
| Three Money Bag Symbols | 100 | 3 | 300 |
| Two Orange Symbols | 255 | 1 | 255 |
| Three Orange Symbols | 45 | 4 | 180 |
| Two Seven Symbols | 128 | 2 | 256 |
| Three Seven Symbols | 32 | 5 | 160 |
| Two Bar Symbols | 85 | 2 | 170 |
| Three Bar Symbols | 15 | 6 | 90 |
| | | Expected Payout | 2411 |
| | | Total Combinations | 8000 |
| | | Payout Percentage | 30.1375 |

FIG. 3F

| Wager | Ways | AEP |
|---|---|---|
| 1 | 3 | 90.4125 |
| 2 | 6 | 90.4125 |
| 3 | 9 | 90.4125 |
| 4 | 12 | 90.4125 |
| 5 | 15 | 90.4125 |
| 6 | 18 | 90.4125 |
| 7 | 27 | 116.2446 |

FIG. 3G

| Symbol | | Column 1 | Column 2 | Column 3 |
|---|---|---|---|---|
| — — | Top | 17 | 21 | 34 |
| | Middle | 17 | 21 | 34 |
| | Bottom | 17 | 21 | 34 |
| CH | Top | 8 | 9 | 12 |
| | Middle | 8 | 9 | 12 |
| | Bottom | 8 | 9 | 12 |
| 1B | Top | 12 | 9 | 12 |
| | Middle | 12 | 9 | 12 |
| | Bottom | 12 | 9 | 12 |
| R7 | Top | 10 | 3 | 5 |
| | Middle | 10 | 3 | 5 |
| | Bottom | 10 | 3 | 5 |
| JP | Top | 6 | 1 | 1 |
| | Middle | 6 | 1 | 1 |
| | Bottom | 6 | 1 | 1 |
| Total | Top | 53 | 43 | 64 |
| | Middle | 53 | 43 | 64 |
| | Bottom | 53 | 43 | 64 |

FIG. 3H

| Win Combo | Pay | Prob. 1 Way | Prob. 3 Ways | Prob. 9 Ways | Prob. 27 Ways | Contrib. 1 Way | Contrib. 3 Ways | Contrib. 9 Ways | Contrib. 27 Ways |
|---|---|---|---|---|---|---|---|---|---|
| CH xx xx | 2 | 11.935% | 35.805% | 22.385% | 22.385% | 0.2387 | 0.2387 | 0.0640 | 0.0298 |
| CH CH xx | 5 | 2.567% | 7.701% | 23.102% | 15.251% | 0.1283 | 0.1283 | 0.1650 | 0.0508 |
| CH CH CH | 20 | 0.592% | 1.777% | 5.331% | 15.994% | 0.1185 | 0.1185 | 0.1523 | 0.2133 |
| 1B 1B 1B | 30 | 0.889% | 2.666% | 7.997% | 23.991% | 0.2666 | 0.2666 | 0.3427 | 0.4798 |
| R7 R7 R7 | 100 | 0.103% | 0.309% | 0.926% | 2.777% | 0.1028 | 0.1028 | 0.1322 | 0.1851 |
| JP JP JP | 500 | 0.004% | 0.012% | 0.037% | 0.111% | 0.0206 | 0.0206 | 0.0264 | 0.0370 |
| | | 16.0898% | 48.2695% | 59.7785% | 80.5090% | | | | |
| | | | | | | 87.549% | 87.549% | 88.269% | 99.589% |
| | | | | | | | -0.000% | -0.720% | -11.320% |

FIG. 4A

| Paylines/ways selected | 1 Occurrence of 3 symbol combination Pays | Explanation |
|---|---|---|
| 27 paylines | 5 credits | 5 credits x 1 payline which runs through symbol combination |
| 27 ways | 5 credits | 1 way |
| 81 paylines | 15 credits | 5 credits x 3 paylines which runs through symbol combination |
| 81 ways | 5 credits | 1 way |
| 243 paylines | 45 credits | 5 credits x 9 paylines which run through symbol combination |
| 243 ways | 5 credits | 1 way |

Layout #1

| | Hits | Payout | Percentage |
|---|---|---|---|
| 2 Bars | 510 | 2 | 6.38% |
| 3 Bars | 90 | 6 | 3.38% |

Layout #2

| | Hits | Payout | Percentage |
|---|---|---|---|
| 2 Bars | 210 | 2 | 2.63% |
| 3 Bars | 90 | 6 | 3.38% |

Layout #3

| | Hits | Payout | Percentage |
|---|---|---|---|
| 2 Bars | 255 | 2 | 6.38% |
| 3 Bars | 45 | 6 | 3.38% |

Layout #4

| | Hits | Payout | Percentage |
|---|---|---|---|
| 2 Bars | 420 | 2 | 2.63% |
| 3 Bars | 180 | 6 | 3.38% |

FIG. 6B

| | R1 | R2 | R3 |
|---|---|---|---|
| Cherry | 4 | 7 | 5 |
| Money Bag | 4 | 5 | 5 |
| Orange | 3 | 5 | 3 |
| Seven | 4 | 2 | 4 |
| Blanks | 6 | 0 | 4 |
| BAR | 1 | 3 | 1 |
| | 22 | 22 | 22 |

FIG. 6D

Layout A

| | Hits | Payout | Percentage |
|---|---|---|---|
| 2 Bars | 180 | 2 | 1.69% |
| 3 Bars | 18 | 6 | 0.51% |

Layout B

| | Hits | Payout | Percentage |
|---|---|---|---|
| 2 Bars | 144 | 2 | 1.07% |
| 3 Bars | 18 | 6 | 0.51% |

Layout C

| | Hits | Payout | Percentage |
|---|---|---|---|
| 2 Bars | 378 | 2 | 3.55% |
| 3 Bars | 18 | 6 | 0.51% |

Layout D

| | Hits | Payout | Percentage |
|---|---|---|---|
| 2 Bars | 114 | 2 | 1.07% |
| 3 Bars | 18 | 6 | 0.51% |

Layout E

| | Hits | Payout | Percentage |
|---|---|---|---|
| 2 Bars | 180 | 2 | 1.69% |
| 3 Bars | 18 | 6 | 0.51% |

Layout F

| | Hits | Payout | Percentage |
|---|---|---|---|
| 2 Bars | 378 | 2 | 3.55% |
| 3 Bars | 18 | 6 | 0.51% |

FIG. 6E

| | R1 | R2 | R3 (1/2/3) |
|---|---|---|---|
| Cherry | 4 | 7 | 5 |
| Money Bag | 4 | 5 | 5 |
| Orange | 3 | 5 | 3 |
| Seven | 4 | 2 | 4 |
| Blanks | 1 | 0 | (0/3/3) |
| BAR | 4 | 1 | (3/0/0) |
| | 20 | 20 | 20 |

FIG. 6G

Layout A

| | Hits | Payout | Percentage |
|---|---|---|---|
| 2 Bars | 240 | 2 | 2.559% |
| 3 Bars | 36 | 6 | 1.35% |

Layout B

| | Hits | Payout | Percentage |
|---|---|---|---|
| 2 Bars | 136 | 2 | 1.70% |
| 3 Bars | 24 | 6 | 0.90% |

Layout C

| | Hits | Payout | Percentage |
|---|---|---|---|
| 2 Bars | 408 | 2 | 5.10% |
| 3 Bars | 72 | 6 | 2.70% |

Layout D

| | Hits | Payout | Percentage |
|---|---|---|---|
| 2 Bars | 136 | 2 | 1.70% |
| 3 Bars | 24 | 6 | 0.90% |

Layout E

| | Hits | Payout | Percentage |
|---|---|---|---|
| 2 Bars | 204 | 2 | 2.55% |
| 3 Bars | 36 | 6 | 1.35% |

Layout F

| | Hits | Payout | Percentage |
|---|---|---|---|
| 2 Bars | 408 | 2 | 5.10% |
| 3 Bars | 72 | 6 | 2.70% |

The cherry symbol of the first reel column and the bar symbol of the second reel column did not form a string of related symbols. Accordingly, you did not win an award for these symbol positions.

Total Award 64 0

The cherry symbol of the first reel column and the cherry symbol of the second reel column formed a string of related symbols. Accordingly, your award for these symbol positions is fifty.

Total Award 64 50

The cherry symbol of the first reel column and the seven symbol of the second reel column did not form a string of related symbols. Accordingly, you did not win an award for these symbol positions.

The bar symbol of the first reel column and the seven symbol of the second reel column did not form a string of related symbols. Accordingly, you did not win an award for these symbol positions.

Total Award 64 150

FIG. 10A

| Symbol | | Column 1 | Column 2 | Column 3 |
|---|---|---|---|---|
| — — | Top | 15 | 17 | 46 |
| | Middle | 17 | 25 | 35 |
| | Bottom | 14 | 19 | 47 |
| CH | Top | 5 | 10 | 15 |
| | Middle | 8 | 20 | 4 |
| | Bottom | 6 | 12 | 14 |
| 1B | Top | 23 | 3 | 8 |
| | Middle | 2 | 7 | 23 |
| | Bottom | 20 | 3 | 11 |
| R7 | Top | 12 | 17 | 4 |
| | Middle | 7 | 5 | 3 |
| | Bottom | 10 | 22 | 2 |
| JP | Top | 4 | 5 | 1 |
| | Middle | 3 | 2 | 1 |
| | Bottom | 5 | 7 | 1 |
| Total | Top | 59 | 52 | 74 |
| | Middle | 37 | 59 | 66 |
| | Bottom | 55 | 63 | 75 |

FIG. 10B

| Win Combo | Pay | Prob. 1 Way | Prob. 3 Ways | Prob. 9 Ways | Prob. 27 Ways | Contrib. 1 Way | Contrib. 3 Ways | Contrib. 9 Ways | Contrib. 27 Ways |
|---|---|---|---|---|---|---|---|---|---|
| CH xx xx | 2 | 14.292% | 27.105% | 11.843% | 11.843% | 0.2858 | 0.1807 | 0.0338 | 0.0158 |
| CH CH xx | 5 | 6.885% | 13.058% | 27.803% | 18.029% | 0.3443 | 0.2176 | 0.1986 | 0.0601 |
| CH CH CH | 20 | 0.444% | 0.842% | 1.794% | 13.318% | 0.0888 | 0.0562 | 0.0512 | 0.1776 |
| 1B 1B 1B | 30 | 0.223% | 3.339% | 6.302% | 10.910% | 0.0670 | 0.3339 | 0.2701 | 0.2182 |
| R7 R7 R7 | 100 | 0.073% | 0.221% | 1.987% | 5.514% | 0.0729 | 0.0738 | 0.2838 | 0.3676 |
| JP JP JP | 500 | 0.004% | 0.012% | 0.088% | 0.243% | 0.0208 | 0.0205 | 0.0626 | 0.0810 |
| | | 21.9222% | 44.5776% | 49.8162% | 59.8573% | | | | |
| | | | | | | 87.969% | 88.265% | 90.015% | 92.024% |
| | | | | | | | -0.296% | -1.751% | -2.008% |

GAMING DEVICE AND METHOD HAVING INDEPENDENT REELS AND MULTIPLE WAYS OF WINNING

PRIORITY CLAIM

This application is a continuation patent application of, claims priority to and the benefit of U.S. patent application Ser. No. 11/466,010, filed on Aug. 21, 2006, which is a non-provisional application of, claims priority to and the benefit of U.S. Provisional Patent Application Ser. No. 60/711,601, filed on Aug. 26, 2005, the entire contents of which are incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make wagering gaming devices that provide as much enjoyment, entertainment and excitement as possible for players. Providing interesting and exciting primary or base games and secondary or bonus games in which a player has an opportunity to win potentially large awards or credits is one way to enhance player enjoyment and excitement. Certain known gaming devices use mechanical devices such as reels, wheels or spheres to enhance the attraction of the gaming machines to players and also to enhance the player's game playing experience. These mechanical devices enable a player to see physical movements of a game, a portion of a game, or a functional game event or element which increases the player's enjoyment of the game.

In one slot gaming device, the gaming device includes a plurality of reels and one or more paylines. Such gaming devices include any suitable number of reels, such as three to five reels, which each display any suitable number of symbols per reel, such as three symbols per reel. In these gaming devices, the player initiates the spinning of the reels by making one or more wagers on one or more paylines. Such gaming devices may have one, three, five, nine, fifteen, twenty-five or any other suitable number of paylines which are horizontal, vertical, diagonal or any combination thereof. One type of gaming device includes a payline associated with each possible combination of symbol positions, wherein each payline passes through only one symbol position on each reel. The player wagers on a player selected number or combination of paylines, such as one, two, three, five, ten or fifteen paylines and the reels are activated to spin.

After the reels spin to generate a plurality of symbols, the gaming device analyzes the generated symbols to determine if the gaming device has randomly generated a winning symbol or winning symbol combination on or along one or more of the wagered on paylines. Any awards associated with any winning symbols or winning symbol combinations generated along any wagered on paylines are provided to the player.

In these gaming devices, the awards provided to the player are generally based on the number of paylines that pass through each of the winning symbol combinations. That is, the gaming device separately analyzes each wagered on payline to determine if a winning symbol combination is generated on that payline. For each occurrence of each payline passing through a winning symbol combination, the gaming device provides the player the award associated with that winning symbol combination. For example, in a five reel gaming device, if four related symbols (which form a winning symbol combination) are generated by the first four reels and twelve paylines pass through at least three of those related symbols (i.e., three paylines pass through all four related symbols and nine paylines pass through the first three related symbols), the gaming device provides the player twelve awards (i.e., one award for each payline that passes through the winning symbol combination). These twelve separate awards are for the single occurrence of the winning symbol combination which includes four related symbols. Accordingly, in a gaming device with wagering on paylines, the greater the number of wagered on paylines that pass through a winning symbol combination, the greater the award as compared to an identical winning symbol combination in which fewer wagered on paylines pass through the same winning symbol combination.

In another type of gaming device with reels, the player wagers on a number of ways to win, wherein any award provided to the player is based on the number of associated symbols which are generated in active symbol positions on a requisite number of adjacent reels. In these ways to win gaming devices, any award provided to the player is not based on any paylines that would have passed through the generated winning symbol combination, but rather determined in an alternative manner.

One problem with known ways to win gaming devices is that even though a player may wager on a maximum number of ways to win (such as 243 ways to win for a five reel gaming device which generates three symbols per reel), the setup of the reels restricts the actual possible ways which may provide payouts to a limited number. That is, even though a player may wager on the maximum number of ways to win, the physical restrictions of the reel layout as well as the restrictions based on game probability will result in actual winnings available on less than all of the wagered on ways to win.

For example, if each winning symbol combination required at least two identical symbols, then the only way to win all 243 ways is for all of the fifteen generated symbols to be identical. For each of the generated symbols to be identical, each reel strip must include (for each type of symbol which may be generated by the gaming device) at least three of the same identical symbols which are adjacently arranged on the reel strip. In this example, if cherry symbols, bar symbols, seven symbols, money bag symbols, bell symbols and orange symbols are the six different symbol types which may be generated, then each reel strip must include, in addition to the standard reel strip configuration, at least three adjacent cherry symbols, at least three adjacent bar symbols, at least three adjacent seven symbols, at least three adjacent money bag symbols, at least three adjacent bell symbols and at least three adjacent orange symbols.

In other words, for a five reel gaming device which displays three symbols on each reel, a gaming device designer would have to place three of the same symbols next to each other on the five separate reel strips to create the possibility of displaying fifteen of the same symbol. To lay each reel strip out so all symbol combinations are possible for all ways to win, each reel strip of such a gaming device would have to include over two-thousand symbol positions. This disrupts the mathematics of the game because the odds are dependent on the relative spacing of the symbols on the reels. Accordingly, due to spacing and probability considerations, having a plurality of the same identical symbols which are adjacently arranged on each reel strip is not practicable on a standard reel strip configuration. It should be appreciated that video reels present the same problem because even though they are video simulations of symbols, they still have the same probability constraints and layouts as a standard reel strip.

Another problem with a ways to win gaming device relates to the wagering structure and the associated payouts. As described below, the manner in which the payouts and wins are structured in a ways to win gaming device results in the costs associated with wagering on a way to win being different than the costs associated with wagering on a standard payline. For example, in a gaming device with paylines, the player generally bets or wagers one credit per payline which they desire to be active. In a ways to win gaming device, one wagered credit correlates to the player wagering on more than one way to win, wherein the credits wagered-to-ways to win ratios are usually not of a linear relationship for every wagering possibility. It should be appreciated that since these ratios are not equal for every possibility, problems arise with the wagering scheme of a ways to win gaming device. For example, the betting chart of FIG. 3A illustrates the credits wagered-to-ways to win ratios for a 3×3 reel ways to win gaming device.

As illustrated in FIG. 3A, the credits wagered-to-ways to win ratio is not the same for one credit wagered as it is for seven credits wagered. In this example, a player who wagered one credit purchased three times the number of ways to win of what the wager cost. Additionally, a player who wagered 7 credits purchased 3.857 times the number of ways to win of what the wager cost. This non-linear relationship between credits wagered and purchased ways to win leads to an additional problem with the better scheme of a ways to win gaming device. This additional problem deals directly with the probability of occurrence for the symbols/symbol combinations as related to their expected payouts.

For example, a ways to win gaming device employing the above wagering scheme may be associated with the paytable of FIG. 3B, wherein the reels are laid out according to the format of FIG. 3C, and the reels have the symbol layout of FIG. 3D. Accordingly, such a configuration would yield an expected payout as seen in FIG. 3E. Utilizing this betting chart, the average expected payout percentages ((payout percentage*ways to win purchased)/credit wagered) are seen in FIG. 3F. Thus, as seen in FIG. 3F, a wager of seven credits has a substantially different average expected payout percentage (e.g., 116.2446%) than the average expected payout percentage associated with the other wager amounts (e.g., 90.4125%) due to the non-linear betting scheme of a ways to win gaming device.

As further seen in FIGS. 3G and 3H, utilizing the same symbol layout on each of the reel columns (such as with a standard reel strip wherein the display of one symbol is dependent upon the position/display of other symbols) limits a gaming device designer's control in the appearance of one or more of the symbol combinations. Such a dependent reel strip configuration also limits the gaming device designer's ability to establish winning symbol combinations which are associated with payouts in an acceptable range. As seen in FIGS. 3G and 3H, when utilizing dependent reels, a broad range of hit frequencies exists between a player wagering on 1 way to win and a player wagering on 27 ways to win. This broad range of hit frequencies results in a broad range in payback percentages between the different bets. For example, there is over a 64% difference in the hit frequency which results in over a 12% difference in the payback percentages for a player wagering on 1 way to win compared to a player wagering on 27 ways to win. This discrepancy is the result of the gaming device designer's inability to change the layout of the symbols because of their dependency on other symbols. That is, the gaming device designer is not enabled to change the reel strip layout without affecting the other symbols in that reel column and their associated hit frequency. For example, the gaming device designer can not remove a cherry symbol from the middle position of column 1 without this removal resulting in the cherry symbol also being removed from the top position and the bottom position as well. Accordingly, design opportunities to modify the symbol combinations are limited by the physical dependency of the reel itself.

As also shown in FIGS. 3G and 3H, regardless of the number of ways to win the player wagers on, the same symbol combination (i.e., the 1B-1B-1B symbol combination) is associated with the highest contribution to the total payback. This prevents the gaming device designer from focusing different parts of the game (i.e., different symbol combinations) to different wagering levels. That is, the payouts for designated symbol combinations can not be targeted or focused based on the number of ways to win the player wagers on. This configuration limits the gaming device designer in using payouts to adjust the overall payback percentage for different numbers of wagered on ways to win such that the average expected payout for each different way to win is substantially the same. For example, if the gaming device designer is attempting to modify the payback percentage by adjusting the payout associated with the 1B-1B-1B symbol combination, the change does not have the desired effect because the 1B-1B-1B symbol combination is associated with the highest contribution for each bet level and thus the attempted payout change results in a near uniform change across each bet level. Hence, the gaming device designer is not enabled to focus the payout change on a specific bet level (i.e., a specific number of wagered on ways to win). Additionally, without different combinations focused on different bet levels, the gaming device designer is also limited in making each bet level as attractive as possible for each wager amount. Accordingly, these different average expected payout percentages may present problems in designing and programming a gaming device as well as in obtaining regulatory approval for the gaming device in certain jurisdictions.

Another known gaming device includes a plurality of columns of symbols wherein each symbol is included on a separate independent or unisymbol reel. Each independent or unisymbol reel generates and displays one symbol to the player. Unisymbol display reels exist either as physical reels, such as mechanical or electromechanical reels or as non-physical unisymbol generators, such as simulated or video reels displayed on one or more video display devices.

Referring to FIG. 3I, an exploded representation of a unisymbol or independent reel configuration is illustrated having nine separate displayed symbols "A" through "I" and nine respective exploded unisymbol reels 80 through 96. The unisymbol reels each include a single displayed symbol or blank. A rotational arrow shows that for each reel any symbol can change individually. FIG. 3I also illustrates paylines one through eight connecting the symbols. The unisymbol reels enable vertical paylines, as illustrated by paylines four, five and six because the relative spacing problems associated with vertical paylines on multi-symbol or dependent reels are inapplicable. That is, symbol "A" is included on a reel that is different from the reel of symbol "D" which is included on a reel that is different from the reel of symbol "G".

Accordingly, a need exists to produce a ways to win gaming device in which the actual possible ways to win which may provide payouts is equal to the wagered on number of ways to win.

Accordingly, a need also exists to produce a ways to win gaming device wherein a non-linear betting scheme does not result in substantially different average expected payout percentages for the different wager amounts.

SUMMARY

The present disclosure is directed to a gaming device having independent reels and multiple ways of winning.

In one embodiment, the gaming device utilizes a plurality of selectively activated unisymbol or independent reels to control the number of symbols generated in active symbol positions, the number of ways to win formed (i.e., control the number of possible strings of related symbols which may be classified as described below) and the odds of winning. In other words, in this embodiment, after a plurality of symbols are generated by the unisymbol reels (wherein the number of generated symbols is based on the player's wagered on number of ways to win), the gaming device analyzes any associated symbols which are generated in active symbol positions (i.e., generated by activated unisymbol reels) over a requisite number of adjacent reel groups to determine whether the generated symbols form part or all of a winning symbol combination (i.e., a combination of associated or related symbols). The gaming device determines any outcomes, such as any awards, associated with any formed winning symbol combinations and provides any determined outcomes to the player. It should be appreciated that in this embodiment, unlike a gaming device with paylines, any outcomes provided to the player are not determined based on the number of paylines which may pass through any displayed winning symbol combinations.

In one embodiment, the gaming device includes a plurality of independent or unisymbol symbol generators, such as independent or unisymbol reels. The unisymbol reels are arranged as a number of unisymbol reel groups, wherein each unisymbol reel group includes one or more unisymbol reels. In different embodiments, the unisymbol reel groups are arranged as a plurality of reel columns or a plurality of rows of reels. Each unisymbol reel is adapted to generate each of a plurality of different symbols, wherein one symbol is generated and displayed for each activation of the unisymbol reel. As described below, after one or more unisymbol reels each generate a symbol, the gaming device determines any outcome to provide to the player. Any provided outcome is based on the number of associated symbols which are generated in active symbol positions over a requisite number of adjacent reel groups, wherein each symbol generated and displayed by an activated or designated unisymbol reel is considered a symbol generated at an active symbol position. It should be appreciated that by utilizing shading or any other suitable manner, one or more symbols generated by unisymbol reels may be displayed to the player but otherwise designated as inactive symbol positions for award determination purposes.

In one embodiment, the present disclosure provides a ways to win gaming device which utilizes the plurality of unisymbol reels that the gaming device is adapted to generate the requisite symbols such that a player may win on each of the ways to win the player wagered on, regardless of the number of ways which the player wagers to win on. In this embodiment, as each unisymbol reel generates symbols independent of the other unisymbol reels and as each unisymbol reel is adapted to generate the same symbols, the plurality of unisymbol reels may each simultaneously generate the same symbol and thus a player may win on each wagered on way to win. For example, while spacing and probability considerations restrict a player who wagers on 243 ways to win at a multi-symbol or dependent reel gaming device from winning on all 243 ways to win, a player who wagers on 243 ways to win at a unisymbol reel gaming device may actually win on all 243 ways to win.

Moreover, the present disclosure provides a ways to win gaming device which utilizes the plurality of unisymbol reels to provide that a ways to win gaming device with a non-linear betting scheme does not result in substantially different average expected payout percentages for the different wager amounts. In this embodiment, as described below, since certain unisymbol reels are only designated or activated to generate symbols at active symbol positions when the number of wagered on ways reaches or exceeds a designated amount, these unisymbol reels are designed with appropriate symbol configurations (i.e., the probabilities associated with each symbol being generated) to ensure that the average expected payout for the designated number of wagered on ways corresponds with the average expected payout for the other numbers of wagered on ways. For example, for a ways to win gaming device with three columns of unisymbol reels which utilizes the credits wagered-to-ways to win ratio described above, one unisymbol reel in the third reel column would only be activated to generate a symbol at an active symbol position when nineteen to twenty-seven ways are wagered on (i.e., a wager amount of seven credits). Accordingly, the gaming device designer may alter the symbol configuration or symbol probabilities associated with this unisymbol reel in the third reel column, such as increasing the probability that lower paying symbols may be generated by this unisymbol reel, to bring down the overall payout percentage and thus ensure that the average expected payout for a seven credit wager is more in line with the average expected payouts of the other wager amounts.

In one embodiment of the ways to win gaming device disclosed herein, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device more ways to win for an equivalent bet or wager than a player's bet or wager on a traditional slot gaming device with paylines.

FIG. 4A illustrates a comparison between the awards provided to a player for one occurrence of the same three symbol combination generated by a traditional three-row, five reel gaming device with paylines versus a three-row, five reel column gaming device which provides a player a designated number of ways to win. As seen in FIG. 4A, if the player wagers on twenty-seven paylines and twenty-seven ways to win, the player is provided the same award for each different type of gaming device. If the player wagers on eighty-one paylines and eighty-one ways to win, the gaming device provides the player different awards depending on which type of gaming device is played. In this example, the ways to win gaming device provided the player the same award because the occurrences of the winning symbol combination remains the same. On the other hand, the gaming device with paylines provided the player three times the award because three paylines pass through the winning symbol combination and thus the gaming device provides the player a separate award for each such payline. It should be appreciated that, as described above, because a gaming device with wagering on ways to win provides the player one award for a single occurrence of a winning symbol combination and a gaming device with paylines may provide the player more than one award for the same occurrence of a single winning symbol combination, for an equivalent bet or wager it is possible to provide a player at a ways to win gaming device more ways to win than the number of active paylines on a traditional slot gaming device with paylines.

In one embodiment of the ways to win gaming device disclosed herein, the total number of ways to win is determined by multiplying the number of symbols generated in active symbol positions in a first unisymbol reel group by the number of symbols generated in active symbol positions in a second unisymbol reel group by the number of symbols generated in active symbol positions in a third unisymbol reel group and so on for each unisymbol reel group of the gaming device with at least one symbol generated in an active symbol position. For example, a three reel column gaming device with three unisymbol reels each generating a symbol in an active symbol position includes 27 ways to win (i.e., 3 symbols in the first reel column×3 symbols in the second reel column×3 symbols in the third reel column). A four reel column gaming device with three unisymbol reels each generating a symbol in an active symbol position includes 81 ways to win (i.e., 3 symbols in the first reel column×3 symbols in the second reel column×3 symbols in the third reel column×3 symbols in the fourth reel column). A five reel column gaming device with three unisymbol reels each generating a symbol in an active symbol position includes 243 ways to win (i.e., 3 symbols in the first reel column×3 symbols in the second reel column×3 symbols in the third reel column×3 symbols in the fourth reel column×3 symbols in the fifth reel column). It should be appreciated that modifying the number of generated symbols by either modifying the number of reel columns or modifying the number of symbols generated in active symbol positions in one or more of the unisymbol reel groups, modifies the number of ways to win.

In another embodiment of the ways to win gaming device disclosed herein, the gaming device enables a player to wager on unisymbol reel groups. In this embodiment, if based on the player's wager, a unisymbol reel group is activated, then each of the unisymbol reels of that unisymbol reel group will generate a symbol at an active symbol position and such active symbol positions will be part of one or more of the ways to win. In one embodiment, if based on the player's wager, a unisymbol reel group is not activated, then a designated number of default unisymbol reels, such as a single unisymbol reel of that unisymbol reel group, will generate a symbol at an active symbol position and such default active symbol position(s) will be part of one or more of the ways to win. This type of gaming machine enables a player to wager on one, more or each of the unisymbol reel groups and the processor of the gaming device uses the number of wagered on unisymbol reel groups to determine the active symbol positions and the number of possible ways to win.

In such gaming devices wherein a player wagers on one or more unisymbol reel groups, a player's wager of one credit may cause each of the three unisymbol reels in a first reel group to generate a symbol at an active symbol position, wherein one default unisymbol reel generates a symbol at a default active symbol position for each of the four remaining unisymbol reel groups. In this example, as described above, the gaming device provides the player three ways to win (i.e., 3 symbols for the first unisymbol reel group×1 symbol for the second unisymbol reel group×1 symbol for the third unisymbol reel group×1 symbol for the fourth unisymbol reel group×1 symbol for the fifth unisymbol reel group). In another example, a player's wager of nine credits may cause each of the three unisymbol reels of a first unisymbol reel group to each generate a symbol at an active symbol position, each of the three unisymbol reels of a second unisymbol reel group to each generate a symbol at an active symbol position and each of the three unisymbol reels of a third unisymbol reel group to generate a symbol at an active symbol position, wherein one default unisymbol reel generates a symbol at a default active symbol position for each of the remaining two unisymbol reel groups. In this example, as described above, the gaming device provides the player twenty-seven ways to win (i.e., 3 symbols for the unisymbol reel group×3 symbols for the second unisymbol reel group×3 symbols for the third unisymbol reel group×1 symbol for the fourth unisymbol reel group×1 symbol for the fifth unisymbol reel group).

In one embodiment, the gaming device individually determines if a symbol generated in an active symbol position by a unisymbol reel in a first reel group forms part of a winning symbol combination with or is otherwise suitably related to a symbol generated in an active symbol position by a unisymbol reel in a second reel group. In this embodiment, the gaming device classifies, designates or characterizes each pair of symbols which form part of a winning symbol combination (i.e., each pair of related symbols) as a string of related symbols. For example, if active symbol positions include a first cherry symbol generated by a first unisymbol reel in a first reel column and a second cherry symbol generated by a second unisymbol reel in a second reel column, the gaming device classifies the two cherry symbols as a string of related symbols because the two cherry symbols form part of a winning symbol combination. It should be appreciated that since each symbol is generated by an independent symbol generator, the ways to win gaming device may analyze symbols vertically (i.e., determine if any strings of related symbols are formed from one row of symbol to another row of symbols) or horizontally (i.e., determine if any strings of related symbols are formed from one reel column to another reel column). It should be further appreciated that the ways to win gaming device may analyze generated symbols in a left-to-right configuration, in a right-to-left configuration or both configurations.

After determining if any strings of related symbols are formed between the symbols of the first reel group and the symbols of the second reel group, the gaming device determines if any of the symbols generated in any active symbol positions by any active unisymbol reels in the next adjacent reel group should be added to any of the formed strings of related symbols. In this embodiment, for a first of the classified strings of related symbols, the gaming device determines if any of the symbols generated in any active symbol positions by any active unisymbol reels in the next adjacent reel group form part of a winning symbol combination or are otherwise related to the symbols of the first string of related symbols. If the gaming device determines that a symbol generated in an active symbol position by an active unisymbol reel in the next adjacent reel group is related to the symbols of the first string of related symbols, that symbol is subsequently added to the first string of related symbols. For example, if the first string of related symbols is the string of related cherry symbols and a related cherry symbol is generated in an active symbol position by a third unisymbol reel in the third reel column, the gaming device adds the related cherry symbol generated in the third reel column to the previously classified string of cherry symbols. It should be appreciated that if two (or more) symbols generated in active symbol positions in the next adjacent reel group are both related to the symbols of the first string of related symbols, then one of the related symbols is added to the first string of related symbols and the other related symbol is added to the first string of related symbols and this string (which includes the related symbols from the first two reel groups and the other related symbol from the next adjacent reel group) is reclassified, redesignated or recharacterized as a second string of related symbols.

On the other hand, if the gaming device determines that no symbols generated in any active symbol positions by any active unisymbol reels in the next adjacent reel group are related to the symbols of the first string of related symbols, the gaming device marks or flags such string of related symbols as complete. For example, if the first string of related symbols is the string of related cherry symbols and none of the symbols in the third reel column are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols in the first reel group and the second reel group.

After analyzing each of the remaining strings of related symbols, the gaming device determines, for each remaining pending or incomplete string of related symbols, if any of the symbols generated at active symbol positions in the next adjacent reel group should be added to any of the previously classified strings of related symbols. This process continues until either each string of related symbols is complete or there are no more adjacent reel groups (with at least one symbol generated in an active symbol position by at least one unisymbol reel) to analyze. In this embodiment, when there are no more adjacent reel groups to analyze, the gaming device marks each of the remaining pending strings of related symbols as complete.

When each of the strings of related symbols is marked complete, the gaming device compares each of the strings of related symbols to an appropriate paytable and provides the player any outcomes, such as any awards, associated with each of the completed strings of symbols. It should be appreciated that the player is provided one outcome or award, if any, for each string of related symbols (i.e., as opposed to being based on how many paylines that would have passed through each of the strings of related symbols).

In this embodiment, as described above, the greater the number of active unisymbol reels (i.e., the greater the number of symbols generated in active symbol positions), the greater the number of possible strings of related symbols which may be classified (i.e., the greater the number of potential winning ways to win) and thus the greater the number of separate awards which may be provided to the player. For example, if a player wagers on eight ways to win (and thus two unisymbol reels in each of three reel columns are each activated to generate a symbol), the greatest number of strings of related symbols which may be classified is eight if all six generated symbols were related to one another. On the other hand, if the player wagers on twenty-seven ways to win (and thus three unisymbol reels in each of three reel columns are each activated to generate a symbol), the greatest number of strings of related symbols which may be classified is twenty-seven if all nine generated symbols were related to one another. Accordingly, in this embodiment, the maximum number of strings of related symbols which may be classified is based on the number of symbols generated and displayed at active symbol positions (i.e., the number of unisymbol reels which each generate a symbol), wherein the greater the number of displayed symbols, the greater the number of strings of related symbols which may be classified.

In one embodiment, the gaming device utilizes shading or other suitable masking techniques of the non-active symbol positions to provide that different reel groups may generate or display different numbers of symbols. In one embodiment, even though symbols are generated by unisymbol reels at non-active symbol positions, these symbols are suitably shaded or otherwise suitably marked to indicate to a player that such symbol positions are not active. It should be appreciated that such shading techniques may be employed with physical unisymbol generators, such as mechanical or electromechanical reels, or with non-physical unisymbol generators, such as video unisymbol reels displayed on one or more display devices.

In one embodiment, the gaming device limits or conditions the number of unisymbol reels which generate symbols and thus the number of strings of related symbols which may be classified, based on the player's wager. For example, the greater the player's wager, the greater the number of unisymbol reels which generate symbols at active symbol positions and thus the greater the number of strings of related symbols which may be classified. In this embodiment, different wager amounts are associated with different numbers of strings of related symbols which may be classified for award determination purposes. For example, a wager of one may be associated with three ways to win (and thus three unisymbol reels in one reel column are each activated to generate a symbol at an active symbol position and one unisymbol reel in each remaining reel column is activated to generate a symbol at an active symbol position) which corresponds with three possible strings of related symbols which may be classified. Additionally, a wager of three may be associated with nine ways to win (and thus three unisymbol reels in each of two reels column are each activated to generate a symbol at an active symbol position and one unisymbol reel in each remaining reel column is activated to generate a symbol at an active symbol position) which corresponds with nine possible strings of related symbols which may be classified for award determination purposes.

As described above, the present disclosure provides a ways to win gaming device which utilizes a plurality of unisymbol reels to provide that the gaming device is adapted to generate the requisite symbols such that a player may win on each of the ways to win the player wagered on, regardless of the number of ways which the player wagers to win on. In this embodiment, as each unisymbol reel generates symbols independent of the other unisymbol reels and as each unisymbol reel is adapted to generate the same symbols, the plurality of unisymbol reels may each simultaneously generate the same symbol and thus a player may win on each wagered on way to win. For example, while spacing and probability considerations may restrict a player who wagers on 243 ways to win at a multi-symbol reel gaming device from winning on all 243 ways to win, a player who wagers on 243 ways to win at a unisymbol reel gaming device can actually win on all 243 ways to win because all fifteen unisymbol reels can each simultaneously generate the same symbol. By implementing an independent or unisymbol reel configuration in a ways payout, the player's bet or wager is maximized because it is possible for the player to win on all 243 ways, as the reels are independent of each other and thus all combinations of symbols are possible. In other words, the unisymbol or independent reels have the capability of generating symbols in a manner that allows a player to achieve winning ways that are just not possible or feasible on a standard reel configuration.

As further described above, the present disclosure also provides a ways to win gaming device which utilizes a plurality of unisymbol reels to provide that a ways to win gaming device with a non-linear betting scheme does not result in substantially different average expected payout percentages for the different wager amounts. That is, as described above, the manner in which a ways to win gaming device is structured allows certain unisymbol reels to only generate symbols when the number of wagered on ways reaches or exceeds a designated amount. For example, a third unisymbol reel in a third reel column will only be activated to generate a symbol when the player wagers seven credits on nineteen to twenty-seven ways to win. As further described in the example described above, a player's wager of seven credits on nineteen to twenty-seven ways to win is when the discrepancy in the average expected payout percentage occurs. Accordingly, the third unisymbol reel in the third reel column is specifically tailored or altered to ensure that the average expected payout for nineteen to twenty-seven wagered on ways to win corresponds with the average expected payout for the other wagered on ways. In one example, the ways to win gaming device may be designed such that a first and second unisymbol reel in a third reel column each include a designated symbol configuration and a third unisymbol reel in the third reel column includes an altered or modified symbol configuration. In this example, the altered or modified symbol configuration may include more lower paying symbols to bring down the overall payout percentage and thus ensure that the average expected payout for a seven credit wager is more in line with the average expected payouts of the other wager amounts. It should be appreciated that by utilizing unisymbol or independent reels, the disclosed gaming device provides for the modification of the layout and distribution of the symbols associated with one or more unisymbol reels without altering the layout and distribution of the other unisymbol reels in the third reel column.

In addition to solving the problem with the non-linearity of the betting scheme described above in the background section, the gaming device disclosed herein identifies and solves another problem that exists with ways to win gaming devices. This problem generally occurs when the pay-combination is less than the number of reels (such as when an award is provided for a three symbol combination on a five reel gaming device). Thus, while the calculations used in the example described above in the background are for a full-pay scenario (such as when an award is provided for a five symbol combination on a five reel gaming device), other mathematical considerations occur when the pay-combination is less than the number of reels.

For example, using the above symbol information, the two bar symbol combination should pay (170/8000) or 2.125% of the time and each three bar symbol combination should pay (90/8000) or 1.125% of the time. The two bar symbol pays in a ways-to-win gaming device payout whenever it is determined that a string of the BAR-BAR symbol combination is formed. That is, if active symbol positions include a first BAR symbol generated in a first reel column and a second BAR symbol generated in a second reel column, the gaming device classifies the two BAR symbols as a string of related symbols because the two BAR symbols form part of a winning symbol combination. As described herein, in one embodiment of a ways to win gaming device, once a string is formed, the gaming device will look for any further active symbols in the next adjacent reel that are related to the current formed string. If a related symbol exists, it will be added to the formed string, essentially overwriting the previous string. This causes certain problems and considerations in designing a ways to win gaming device.

More specifically and relating back to the previous example in the background section, the two bar symbol combination should pay (170/8000) or 2.125% of the time. Ignoring the linearity problem discussed in the background section, this results in a payout percentage of 6.375% (i.e., 3 ways to win for each coin wagered). Likewise, a three bar symbol combination should pay (90/8000) or 1.125% of the time, with a payout percentage of 3.375% (again ignoring the linearity problem of a full wager). Due to the manner in which ways to win payouts are analyzed (i.e., formed strings), as discussed above, this payout percentage is not always met. For example, two of the many different setups (and associated payouts) for 6 ways to win are seen in FIG. 4B. Referring back to the BAR example, the ways to win payouts would hit as seen in FIG. 4C.

In reference to the desired payout percentage described above, Layout #1 meets both desired percentages for the 2 BAR symbol combination and the 3 BAR symbol combination. However, Layout #2 falls significantly short on the desired percentage for the 2 BAR symbol combination. This results from the fact that when a ways-to-win is calculated, the gaming devices uses the strings defined above to form winning combinations.

In a step-by-step example for Layout #2, the gaming device would analyze potential strings including the following symbol positions: BDG, BDH, BEG, BEH, BFG and BFH (in any desired order). In one embodiment, the gaming device would first analyze the B symbol with the D symbol and see if they are suitably related. If a relation occurs, they are formed into a string and the next adjacent unchecked reel group is analyzed (in this case, either reels G or H). For example, if both B and D are BARS, the string now consists of two BAR symbols. The gaming device will then analyze both G and H to see if either is a BAR symbol. For this example, G is a BAR symbol and H is not. The old BD string will essentially be over written as 3 BAR symbols, even though the BDH combination is still two BAR symbols, which is a combination on the paytable. The manner in which ways to win are analyzed will not award a payout of two BAR symbols for this BDH string as the BDG string overwrote it as three bar symbols.

It should be appreciated that this instance is where a discrepancy occurs. That is, even though a result of two bars occurred at BDH, the gaming device will not pay for that two symbol combination because the BDG string of three bar symbols essentially overwrites that two symbol combination. Mathematically, the ways to win gaming device calculation for the payout percentage of two bars in Example #2 is seen in FIG. 4D.

For comparison, the calculations in a payline gaming device for the 2 BAR symbol situation is seen in FIG. 4E. And the calculations for Layout #1 is seen in FIG. 4F.

As can be seen from these calculations, the payline gaming device has the desired payout percentages while the ways to win payout does not. The discrepancy in the ways to win payout can be found in the last part of the calculation of total hits where the number subtracted from 20 is (2×3). In a normal payline gaming device calculation (as described above), this is only 3 (with the different multiplied by the total reels in the reel group), because the payout for the two symbols would still occur if the payline did not have a BAR regardless of the contents of the other reels in the reel group. Likewise, in Example #1 this discrepancy does not occur as there is only one reel in the last reel group, thus the number subtracted from 20 is not multiplied by other reels present. As there is only one reel in the last reel group, no two symbol combinations will be ignored.

However in a ways to win gaming device, the string is essentially overwritten if a BAR occurs in either of the last two reels and thus the calculation must account for a bar occurring on either of the reels in the reel group, resulting in a much lower percentage of payout for the two BAR symbols due to the two BAR symbols being overwritten by a BAR occurring in any position on the last reel set.

This problem also exists between configurations of ways to win of different numbers, not just between two different layouts of the same number of ways to win. Illustrated in FIG. 4G is a comparison between a layout of 3 ways to win and a layout of 12 ways to win (and their associated payout percentages). Referring back to the BAR example, the ways to win payouts would hit as seen in FIG. 4H.

Accordingly, the 3 BARS symbol combination for both of the configurations are consistent with each other (i.e., a desired feature for gaming devices), but the 2 BARS symbol combination payouts are inconsistent for the Layout #4 configuration. This again exists due to the number of reels in the third reel set. As opposed to Layout #3 configuration, which only has one reel in the third reel set, Layout #4 has two reels in the third reel set, again resulting in some of the two BAR configurations not being paid in favor of three BAR configurations.

The manner in which the ways to win are analyzed and thus mathematically calculated creates a challenge in that the payouts for the same symbol combination and for the same number of ways to win can be different based on the reel layouts for that way. Likewise, the payouts for the same symbol combination can be different among different number of ways to win. In the examples described above, both ways to win layouts (Layout #2 and Layout #4) that had two reels in the last reel set caused a discrepancy in the 2 BAR payout because of the multiple reels in the third set resulting in 2 BAR combinations that did not get paid because one of the reels had a BAR symbol even if the other did not. However, the ways to win layouts (Layout #1 and Layout #3) that only had one reel in the last column caused no discrepancy. This creates a challenge for the gaming device designer in their attempt to make the reel payouts match throughout all of the different types of layouts and all of the different numbers of ways.

In one embodiment, one way of making the reel payouts match throughout all of the different types of layouts and all of the different numbers of ways to win is to include more or less of certain designated symbols on one or more unisymbol reels of one or more unisymbol reel groups. For example, as described above, because a string of three designated symbols overwrites a previous formed string of two of the designated symbols, a gaming device designer may include more of the designated symbols on one or more of the unisymbol reels of the second reel group. More designated symbols in the second reel group creates more two symbol strings and thus compensates for the lost pays created when two symbol strings are overwritten as three symbol strings. In another embodiment, rather than increasing or decreasing the number of designated symbols on one or more unisymbol reels of one or more unisymbol reel groups, a gaming device designer may modify or alter the probabilities associated with the existing symbols to increase or decrease the occurrences that designated symbols are generated and thus accommodate for any overwriting of previously formed strings of symbols.

In another embodiment, a gaming device designer may make the reel payouts match throughout all of the different types of layouts and all of the different numbers of ways by employing different unisymbol reels or unisymbol reel configurations for different wager amounts. In this embodiment, depending on the number of ways wagers on, the gaming device utilizes certain unisymbol reels in certain unisymbol reel configurations to control the different symbol combinations possible and thus control the payouts. Accordingly, the gaming device disclosed herein uses independent reels in a ways to win gaming device to allow the gaming device designer maximum freedom in accomplishing this, as changes on one reel would not effect the symbol layouts of any other reels. The gaming device designer could thus modify each reel individually such that the reel payouts match throughout all of the different types of layouts and all of the different numbers of ways to win.

It should be appreciated that in a ways to win gaming device with multi-symbol or dependent reels, such modification abilities described above are not present because the symbols in the each reel column are all dependent on each other as they are associated with one single reel. In other words, a ways to win gaming device with multi-symbol reels provides a gaming device designer little to no ability to configure the reels to overcome any discrepancies in payout because any change made to the symbols on the reel would greatly affect the other symbol positions on that reel. On the other hand, as described above, in a gaming device with unisymbol reels, any symbols generated by a first unisymbol reel are independent of any symbols generated by a second unisymbol reel which are independent of any symbols generated by a third unisymbol reel and so on. Accordingly, by using independent or unisymbol reels, the probabilities associated with the unisymbol reel may be designed to provide an even payout percentage or substantially even payout percentage regardless of whether or not the betting scheme is linear.

Thus, the advantage provided by an independent or unisymbol reel setup is evident in controlling the payouts associated with a discrepancy in the linearity of the betting structure. By allowing for the modification or alteration of the symbol layouts (and thus the probabilities and payouts) associated with each reel individually, the desired betting scheme can be implemented without the negative effects associated with implementing such a scheme on multi-symbol or dependent reels. Accordingly, the gaming device disclosed herein provides a solution for allowing different bets at different levels without compromising the payout percentages of the entire reel configuration.

Other objects, features and advantages will be apparent from the following detailed disclosure, taken in conjunction with the accompanying sheets of drawings, wherein like numerals refer to like parts, elements, components, steps and processes.

Additional features and advantages are described in, and will be apparent from, the following Detailed Description and the figures.

BRIEF DESCRIPTION OF THE FIGURES

FIGS. 3A, 3B, 3C, 3D, 3E and 3F are tables illustrating different aspects of a ways to win gaming device.

FIGS. 3G and 3H are tables illustrating an example symbol configuration and its associated payback percentages in a dependent reel ways to win gaming device.

FIG. 4A is a table illustrating a comparison of the different awards provided to a player based on the winning symbol combination occurring in a payline gaming device and in a ways to win gaming device.

FIGS. 6B, 6C, 6D, 6E, 6F and 6G are tables and equations illustrating different reel layouts and payback percentages for a ways to win gaming device.

FIGS. 10A and 10B are tables illustrating an example symbol configuration and its associated payback percentages in an independent reel ways to win gaming device.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by a central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
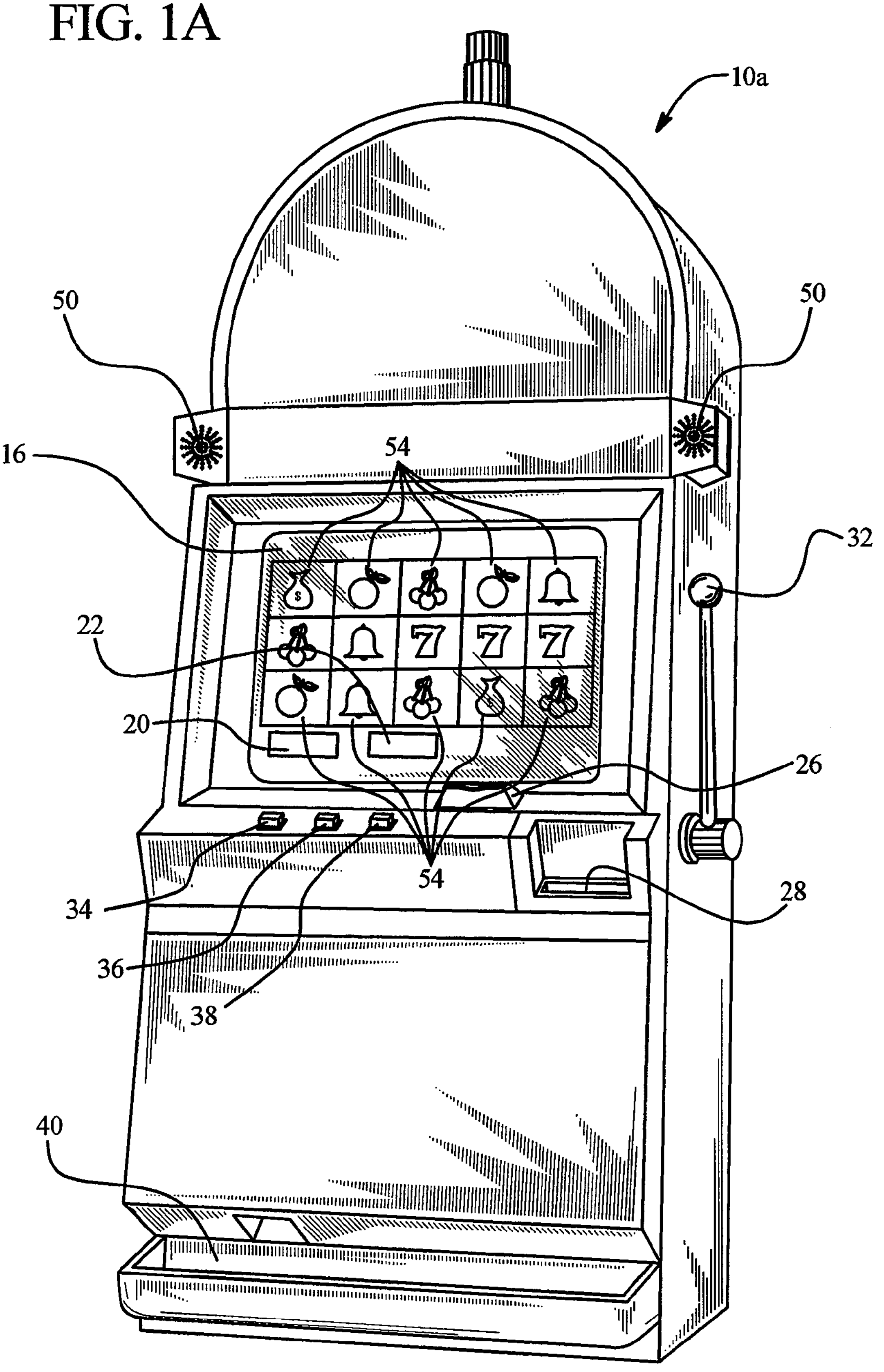
FIG. 1A is a front-side perspective view of one embodiment of the gaming device disclosed herein.
Figure 1B:
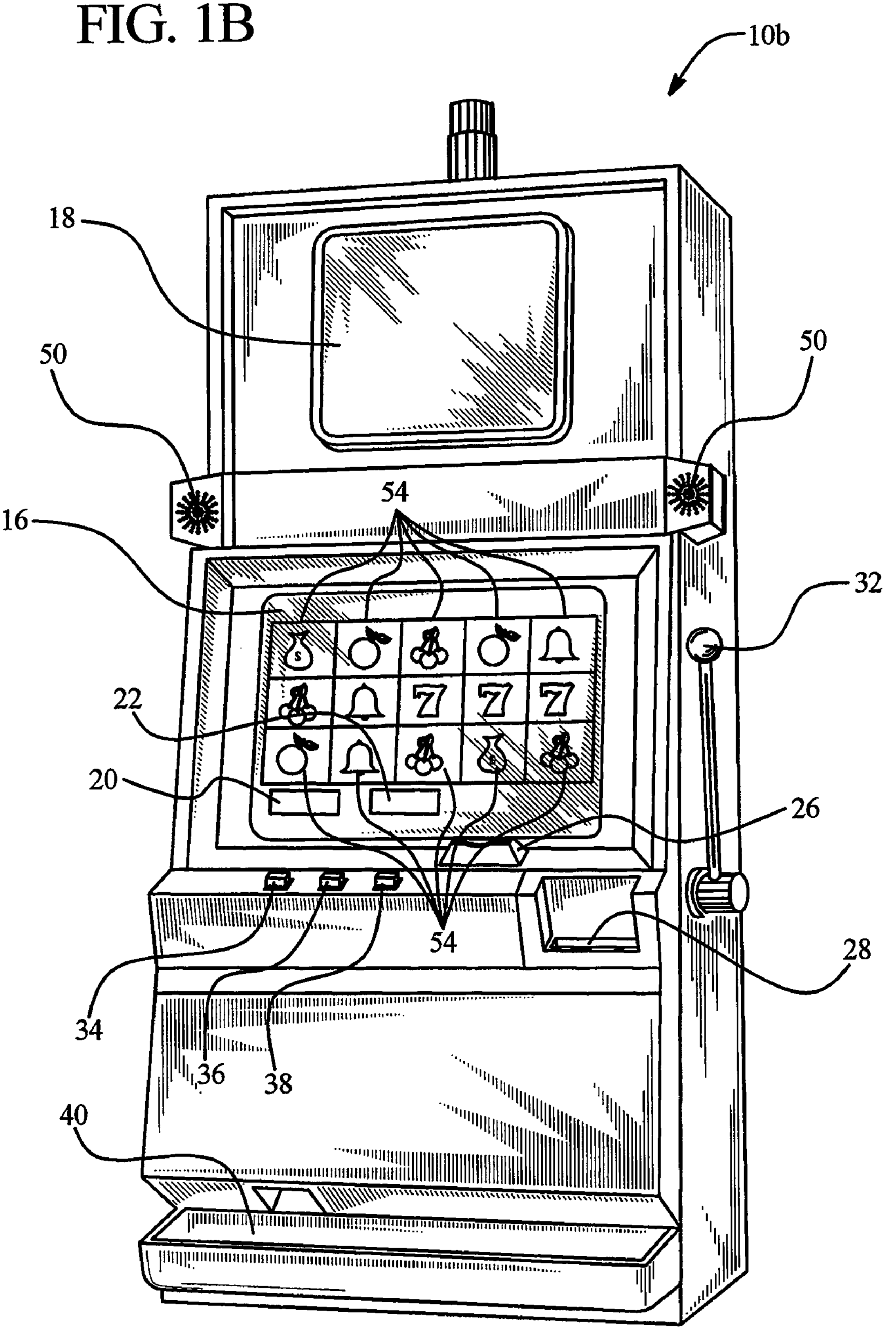
FIG. 1B is a front-side perspective view of another embodiment of the gaming device disclosed herein.

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
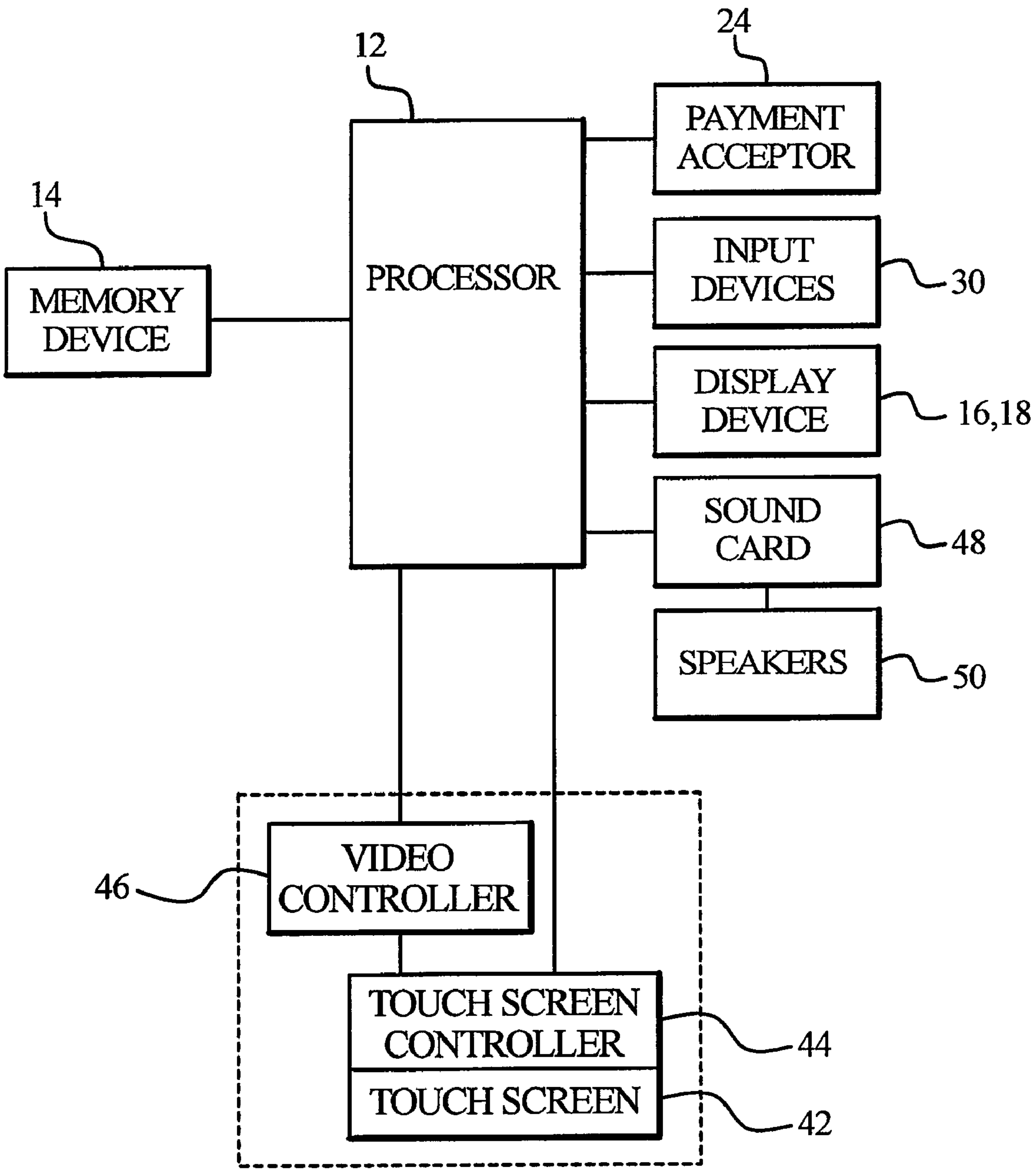
FIG. 2A is a schematic block diagram of the electronic configuration of one embodiment of the gaming device disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. In one such embodiment, this random determination is provided through utilization of a random number generator (RNG), such as a true random number generator, a pseudo random number generator or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. These display devices may also serve as digital glass operable to advertise games or other aspects of the gaming establishment. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Figure 2B:
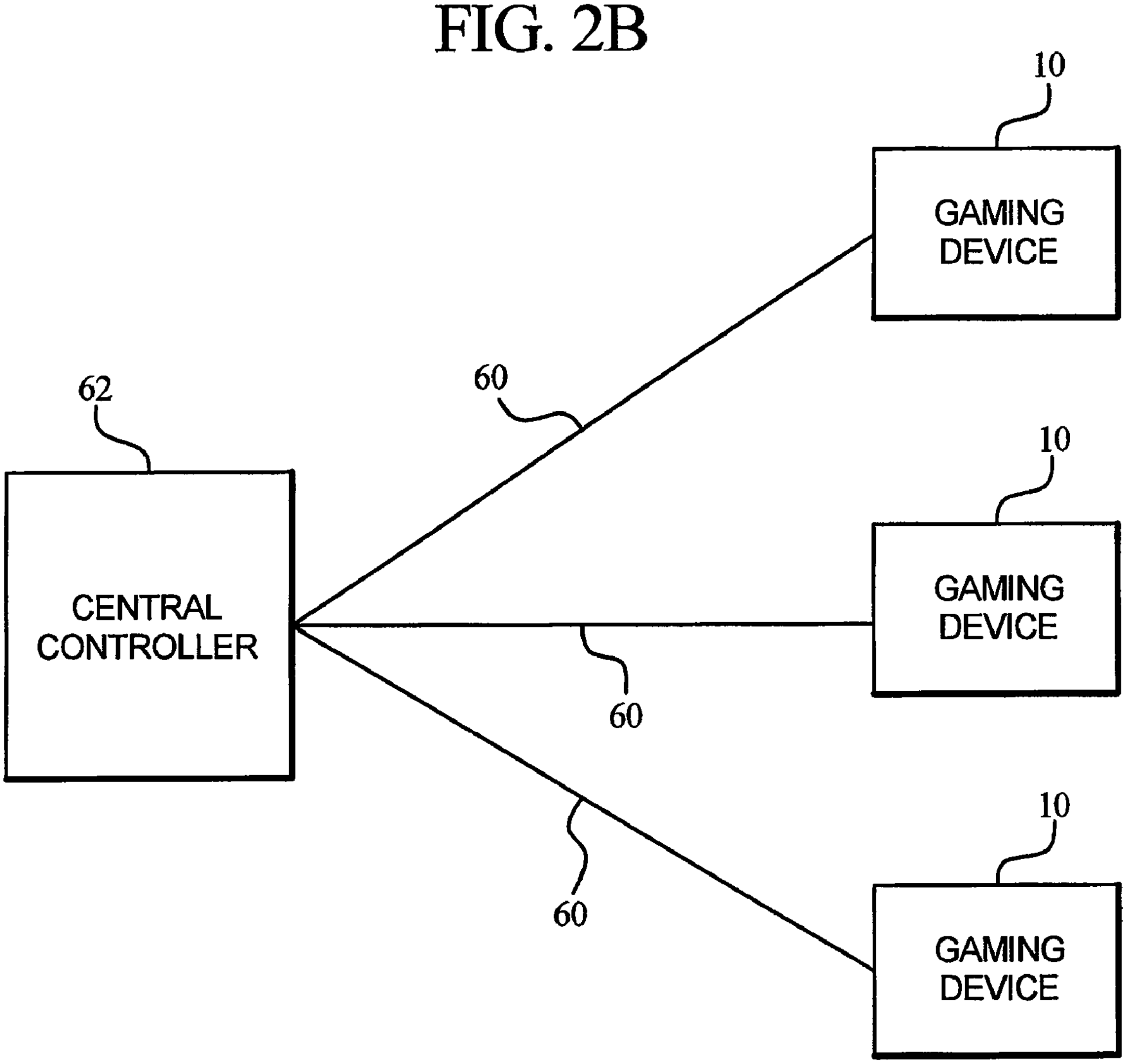
FIG. 2B is a schematic block diagram illustrating a plurality of gaming terminals in communication with a central controller.
Figure 3I:
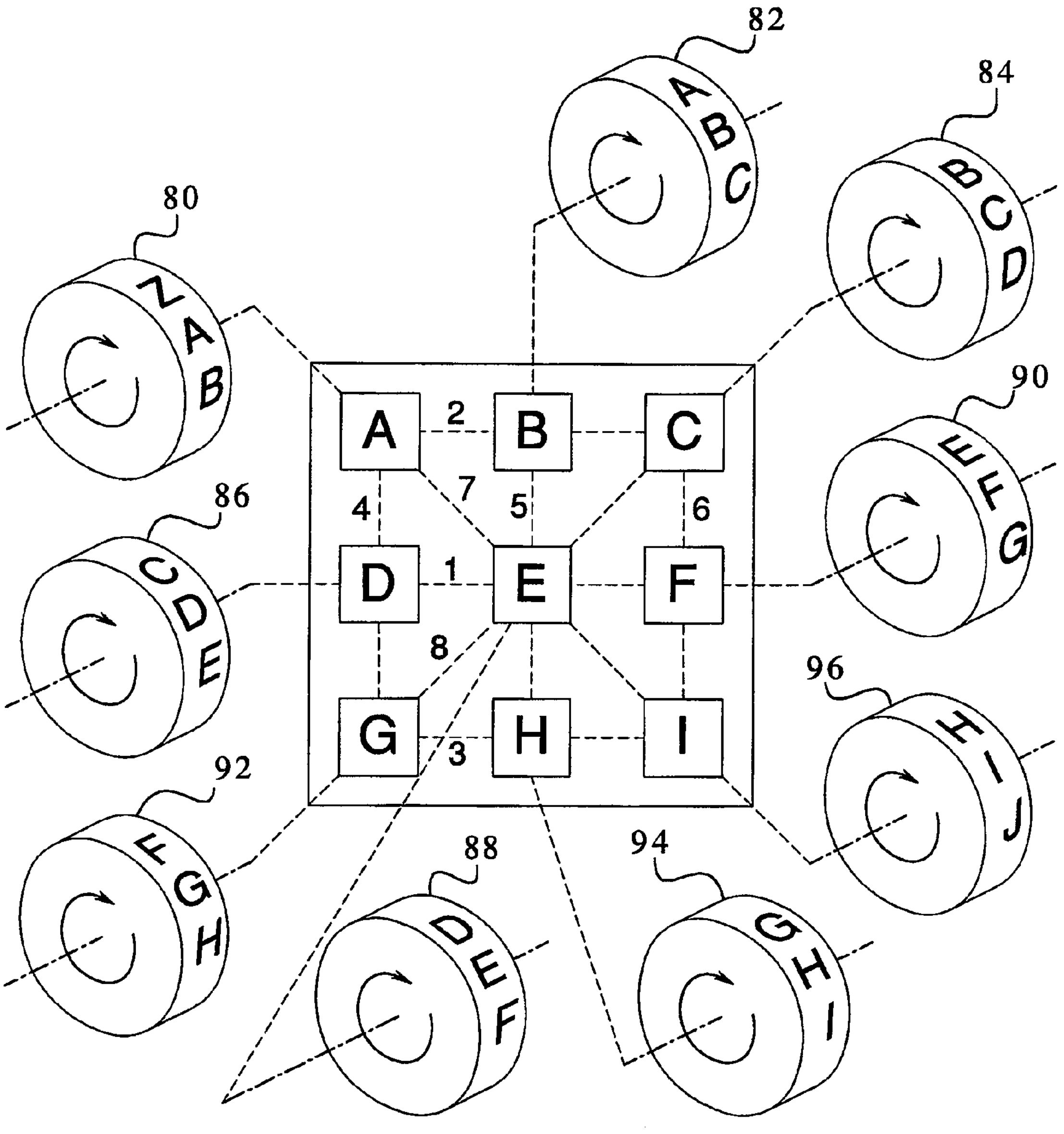
FIG.3I (PRIOR ART)
FIG. 3I is an exploded representation of a unisymbol reel display embodiment having nine separate displayed symbols on a display device and nine respective exploded independent reels.

In one embodiment, as illustrated in FIG. 2B, one or more of the gaming devices 10 are in communication with each other and/or at least one central server, central controller or remote host 62 through a data network or remote communication link 60. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device.

In one embodiment, the bingo, keno or lottery game is displayed to the player. In another embodiment, the bingo, keno or lottery game is not displayed to the player, but the results of the bingo, keno or lottery game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

The gaming device disclosed herein can incorporate any suitable wagering primary or base game. The gaming machine or device may include some or all of the features of conventional gaming machines or devices. The primary or base game may comprise any suitable reel-type game, cascading or falling symbol game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 62 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

In one embodiment, a primary or secondary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the primary or secondary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a primary or secondary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, as illustrated in FIGS. 1A and 1B, a primary or secondary game may be a slot game. In this embodiment, the gaming device displays a plurality of independent or unisymbol symbol generators 54, such as independent or unisymbol reels in either electromechanical form with mechanical rotating reels or video form with simulated reels and movement thereof. In another embodiment, one or more of the reels may be dependent reels which each include a plurality of symbol positions. In one embodiment, an electromechanical slot machine includes a plurality of adjacent, rotatable reels or wheels which may be combined and operably coupled with an electronic display of any suitable type. In another embodiment, if the reels 54 are in video form, one or more of the display devices, as described above, display the plurality of simulated video reels 54. It should be appreciated that the reels may be any suitable type of reel, including both unisymbol reels and dependent reels.

Figure 5:
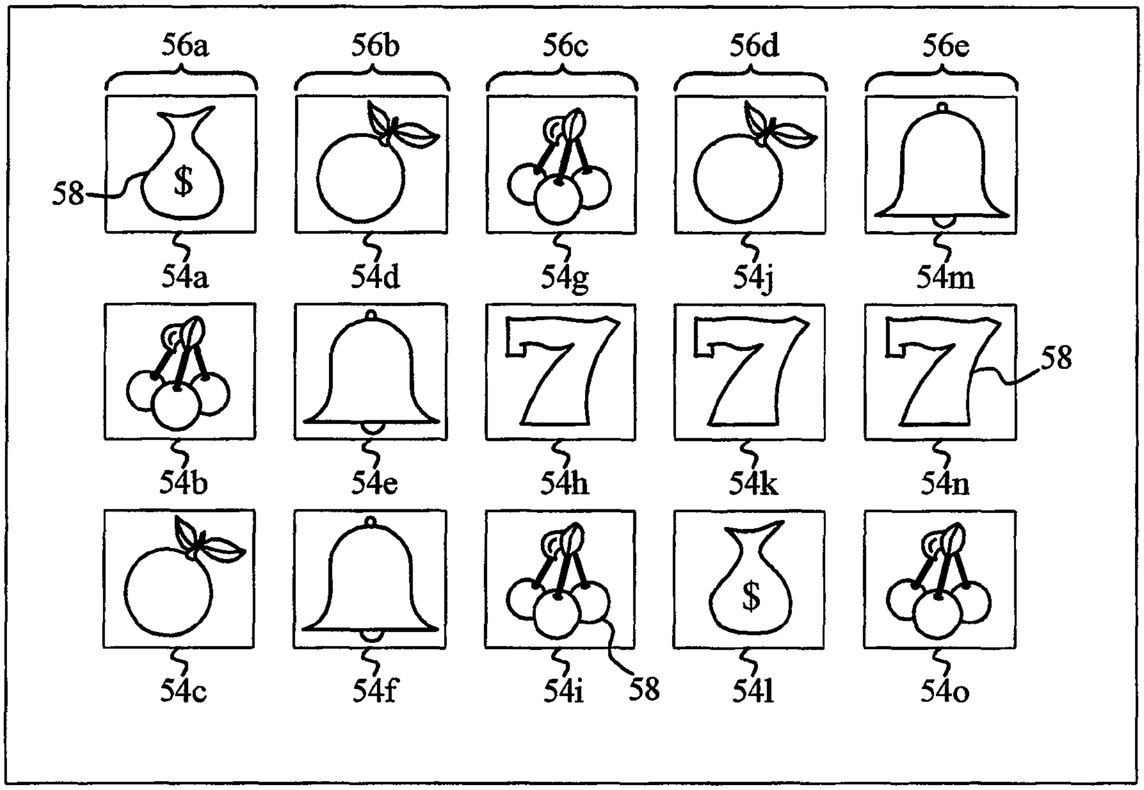
FIG. 5 is an exploded front plan view of a unisymbol reel configuration including five unisymbol reel columns with three unisymbol reels in each reel column.

As illustrated in FIG. 5, unisymbol or independent reels **54*a* to 54*o* are arranged as a number of unisymbol reel groups, such as columns 56*a* to 56*e* wherein each unisymbol reel group includes one or more unisymbol reels. In different embodiments, the unisymbol reel groups are arranged as a plurality of reel columns or a plurality of rows of reels. Each unisymbol reel is adapted to individually generate, independent of the other unisymbol reels, each of a plurality of different indicia or symbols 58**, such as bells, hearts, fruits, numbers, letters, bars, blanks or other images, which preferably correspond to a theme associated with the gaming device. In this embodiment, the gaming device provides outcomes, such as awards, when the unisymbol reels stop spinning if specified types and/or configurations of indicia or symbols occur in a winning pattern, occur on the requisite number of adjacent reels and/or occur in a scatter pay arrangement.

In one embodiment, the gaming device determines any award to provide to the player based on the number of associated symbols which are generated on the requisite number of adjacent unisymbol reels and not based on any paylines that would have passed through any displayed winning symbol combinations. In this embodiment, the gaming device analyzes the symbols generated by the unisymbol reels in each of the active symbol positions to determine if a string of related symbols (i.e., a plurality of symbols which form part or all of a winning symbol combination) are generated wherein each string of related symbols includes one symbol from each of a requisite number of adjacent reel groups. As described below, if one or more strings of related symbols are generated, the gaming device determines if any of the strings of related symbols are associated with any awards and if so, such associated awards are provided to the player.

In one embodiment, the gaming device causes a plurality of unisymbol reels to each generate a symbol, wherein each symbol generated by a unisymbol reel is considered generated in an active symbol position (unless appropriately shaded or otherwise designated as an inactive symbol position). In one embodiment, the gaming device determines if any strings of related symbols are formed between displayed symbols in the first reel group and the displayed symbols in the second reel group by separately analyzing each of the symbols in the first reel column. For example, for a first displayed symbol generated in the first reel column, the gaming device determines whether any displayed symbols generated in the second reel column are related to the first displayed symbol in the first reel column. If the first displayed symbol generated in the first reel column and a displayed symbol generated in the second reel column are related or otherwise form part or all of a winning symbol combination, the gaming device classifies such symbols as a string of related symbols. In this embodiment, after determining if the first displayed symbol generated in the first reel column is related to any displayed symbols generated in the second reel column, the gaming device determines whether a second displayed symbol, if any, generated in the first reel column is related to any displayed symbols generated in the second reel column. If the second displayed symbol generated in the first reel column and a displayed symbol generated in the second reel column are related or otherwise form part or all of a winning symbol combination, the gaming device classifies such symbols as another, separate string of related symbols. This process is repeated for any remaining displayed symbols generated on the first reel column.

After determining if any strings of related symbols are formed between the symbols in the first reel group and the symbols in the second reel group, the gaming device determines if any of the symbols generated at active symbol positions in the next adjacent reel group should be added to any of the formed strings of related symbols. In this embodiment, for each classified string of related symbols, the gaming device determines whether any displayed symbols generated in the next adjacent reel group, in this case a third reel column, are related to or form part or all of a winning symbol combination with the displayed symbols of that string of related symbols.

In one embodiment, the gaming device analyzes the symbols generated in active symbol positions in a left-to-right configuration.

In another embodiment, the gaming device analyzes the symbols generated in active symbol positions in a right-to-left configuration. In another embodiment, the gaming device analyzes one or more of the symbols generated in active symbol positions in a left-to-right configuration and also analyzes one or more of the symbols generated in active symbol positions in a right-to-left configuration.

If no symbols generated and displayed at active symbol positions in the next adjacent reel group are related to any of the symbols of that string of related symbols, the gaming device marks or flags such string of symbols as complete. If any symbols generated and displayed in the next adjacent reel group are related to any of the related symbols which form a string of related symbols, the gaming device adds such symbol generated in the next adjacent reel group to the appropriate string of related symbols. In other words, for each classified string of related symbols, the gaming device analyzes the symbols which form that string of related symbols in light of each of the symbols generated at active symbol positions in the next adjacent reel group to determine if any of the symbols generated in the next adjacent reel group are related to the symbols which form the previously classified string and thus must be added to that string of related symbols.

For example, if two strings of related symbols are classified based on the symbols generated by unisymbol reels in the first reel column and the second reel column, the gaming device determines if any of the symbols generated by unisymbol reels in a third reel column are related to the symbols which formed the first string of related symbols or if any of the generated symbols in the third reel column are related to the symbols which formed the second string of related symbols. In this example, if a symbol generated in an active symbol position by a unisymbol reel in the third reel column is related to the symbols which formed the first string of related symbols, that symbol from the third reel column is added to the first string of symbols. Moreover, if none of the symbols generated by the unisymbol reels in the third reel column are related to the symbols which formed the second string of related symbols, the gaming device marks or flags the second string of related symbols as complete.

After analyzing the displayed symbols in the next adjacent reel group in relation to each of the previously formed strings of related symbols, the gaming device determines if there are any incomplete strings of related symbols remaining or if there is at least one unanalyzed symbol generated and displayed by a unisymbol reel in at least another adjacent reel group. If there is not at least one unanalyzed symbol displayed in at least another adjacent reel group, the gaming device marks each of the remaining pending strings of related symbols as complete. If at least one string of related symbol remains incomplete and at least one symbol is displayed in at least one active symbol position in at least one subsequently adjacent reel group, the gaming device continues the above described process for the next adjacent reel group.

When each string of related symbols is complete, the gaming device compares each of the strings of related symbols to an appropriate paytable and provides the player any award associated with each of the completed strings of symbols. It should be appreciated that since the gaming device does not analyze each of the symbols generated on each of a plurality of paylines, but rather analyzes each of the symbols generated in active symbol positions in the first column of unisymbol reels and the second column of unisymbol reels and then analyzes only the symbols which may be added to any active or incomplete string of related symbols, the processor of such a gaming device may commit less calculations and thus the entire award determination sequence may occur quicker than in a traditional gaming device which analyzes each wagered on payline and may also be quicker than a gaming device which analyzes symbols based on a scatter pay configuration. For example, a gaming device with five columns of five symbols per column may take a significant amount of time computing the outcomes along the over three-thousand paylines which may be wagered on, while a comparable ways to win gaming device with over three-thousand wagered on ways to win would take significantly less computing time. Moreover, since a player's award is based on formed strings of related symbols and not symbols generated on or along active paylines, the disclosed gaming device enables a player to more easily determine why they may be provided a certain award. That is, in a ways to win gaming device, the player simply counts the number of related symbols generated and thus avoids the complications of trying to follow each of the symbols generated on or along a plurality of different paylines.

As described above, the number of ways to win (i.e., the number of symbol combinations which each may be classified as a string of related symbols) which are analyzed is based on the number of symbols generated and displayed by unisymbol reels at active symbol positions (i.e., the greater the number of symbols generated at active symbol positions, the greater the number of strings of related symbols to analyze). Thus, limiting the number of active unisymbol reels to limit the number of symbols generated at active symbol positions limits the potential strings of related symbols which much be analyzed.

In one embodiment, the number of active unisymbol reels which will each generate a symbol (i.e., the number of symbols generated at active symbol positions) and thus the number of ways to win provided to the player is based on the player's wager. For example, for a gaming device with fifteen unisymbol reels arranged as five reel columns with three unisymbol reels in each reel column, a player's wager of one credit may be associated with three ways to win, a player's wager of three credits may be associated with nine ways to win, a player's wager of nine credits may be associated with twenty-seven ways to win, a player's wager of fifteen credits may be associated with eighty-one ways to win and a player's wager of twenty-five credits may be associated with two-hundred-forty-three ways to win. In this example, based on the player's wager, the gaming device activates certain of the unisymbol reels to provide that the number of symbols generated in active symbol positions corresponds with the number of ways to win associated with the player's wager.

Figure 6A:
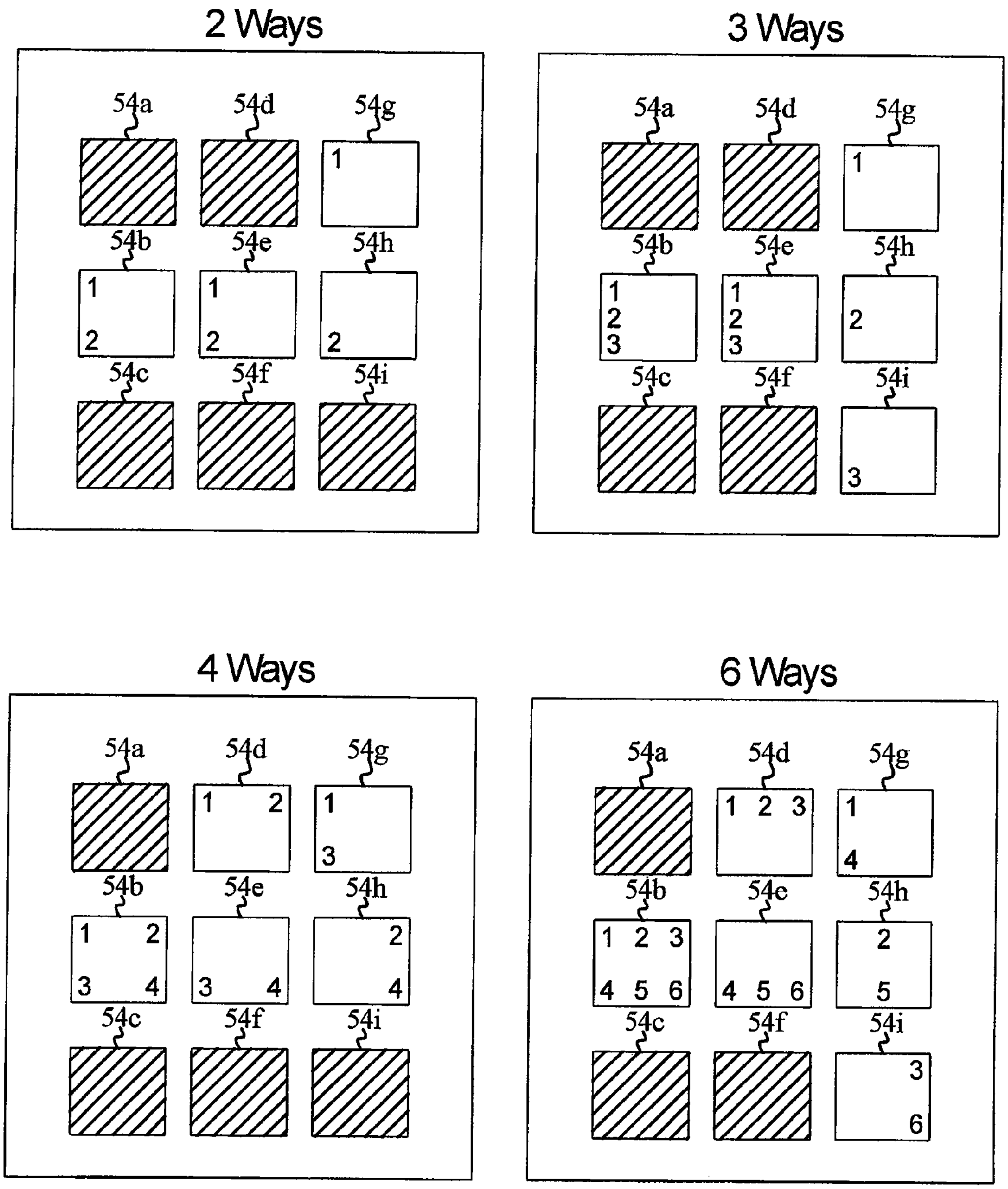
FIG. 6A is a table illustrating one example of the different ways to win which may be provided to the player.

FIG. 6A illustrates to the player one example of the different active symbol positions included for four different numbers of ways to win for a gaming device with nine unisymbol reels arranged as three reel columns with three unisymbol reels in each reel column. In this example, if the player wagers on four ways to win, then: (1) the first way to win includes the symbol generated by unisymbol reel 54*b* in the first reel column, the symbol generated by unisymbol reel 54*d* in the second reel column and the symbol generated by unisymbol reel 54*g* in the third reel column (as indicated by the "1" in the appropriate active symbol positions); (2) the second way to win includes the symbol generated by unisymbol reel 54*b* in the first reel column, the symbol generated by unisymbol reel 54*d* in the second reel column and the symbol generated by unisymbol reel 54*h* in the third reel column (as indicated by the "2" in the appropriate active symbol positions); (3) the third way to win includes the symbol generated by unisymbol reel 54*b* in the first reel column, the symbol generated by unisymbol reel 54*e* in the second reel column and the symbol generated by unisymbol reel 54*g* in the third reel column (as indicated by the "3" in the appropriate active symbol positions); and (4) the fourth way to win includes the symbol generated by unisymbol reel 54*b* in the first reel column, the symbol generated by unisymbol reel 54*e* in the second reel column and the symbol generated by unisymbol reel 54*h* in the third reel column (as indicated by the "4" in the appropriate active symbol positions). It should be appreciated that in this example, for the remaining unisymbol reels which do not generate symbols at active symbol positions either: (1) no symbols are displayed as generated at any of these inactive symbol positions, or (2) any symbols generated at these inactive symbol positions may be displayed to the player but suitably shaded or otherwise designated as inactive.

Figure 7A:
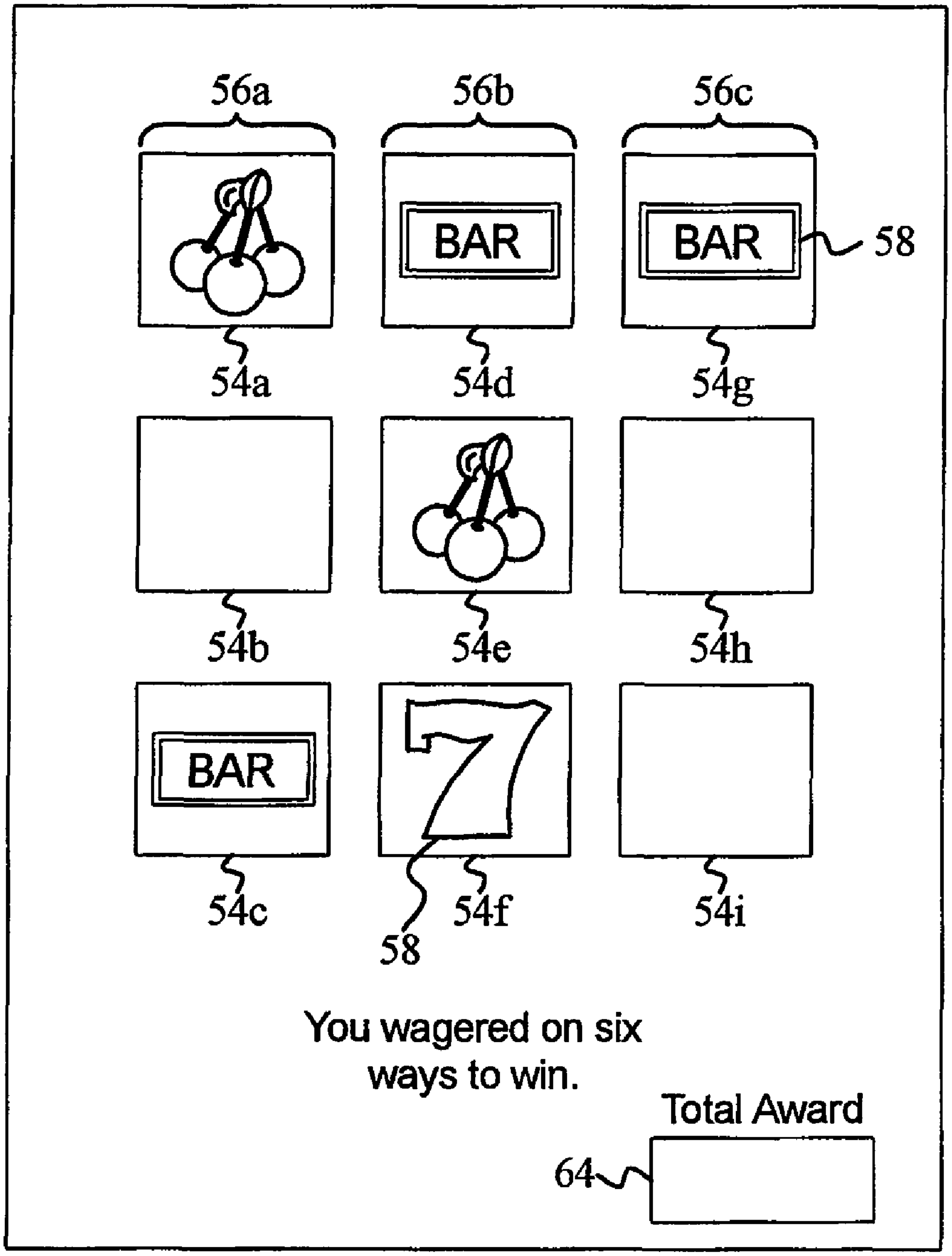
FIG. 7A is an enlarged elevation view of one embodiment of the gaming device disclosed herein, illustrating a player wagering on six ways to win and the gaming device utilizing a plurality of the unisymbol reels to generate and display the requisite number of symbols which correlates to six ways to win.

FIG. 7A illustrates one embodiment wherein the player wagered on six ways to win at a gaming device with nine unisymbol reels 54*a* to 54*i* arranged as three reel columns 56*a* to 56*c* with three unisymbol reels in each reel column. In this embodiment, six ways to win corresponds to one symbol generated and displayed at an active symbol position by one unisymbol reel in one of the reel columns, two symbols generated and displayed at active symbol positions by two unisymbol reels in another of the reel columns and three symbols generated and displayed at active symbol positions by three unisymbol reels in another of reel columns. Accordingly, upon a suitable triggering event, such as the player's wager, the gaming device activates six of the unisymbol reels to each generate and display a symbol at the respective symbol position of that unisymbol reel. In this example, for the first reel column 56*a,* unisymbol reel 54*a* generates and displays a cherry symbol and unisymbol reel 54*c* generates and displays a bar symbol. For the second reel column 56*b,* unisymbol reel 54*d* generates and displays a bar symbol, unisymbol reel 54*e* generates and displays a cherry symbol and unisymbol reel 54*f* generates and displays a seven symbol. For the third reel column 56*c,* unisymbol reel 54*g* generates and displays a bar symbol. After selectively activating a plurality of the unisymbol reels to control the number of generated symbols displayed to the player, the gaming device determines if any strings of related symbols are generated for any of the provided ways to win. Appropriate messages such as "YOU WAGERED ON SIX DIFFERENT WAYS TO WIN" may be provided to the player visually, or through suitable audio or audiovisual displays. It should be appreciated that one, more or each of the remaining unisymbol reels may each generate and display a symbol, but such generated symbol will not be considered displayed at active symbol positions and may be suitably shaded or otherwise designated as symbols generated at non-active symbol positions.

In different embodiments, if one or more reel columns each must display a plurality of generated symbols, the determination of how many unisymbol reels each reel columns will activate to generate symbols at active symbol positions is predetermined, randomly determined, determined based on the player's status (such as determined through a player tracking system), determined based on a random determination by the central controller, determined based on a random determination at the gaming machine, determined based on one or more side wagers placed, determined based on the player's wager, determined based on time (such as the time of day) or determined based on any other suitable method or criteria. For example, if the player wagers on three ways to win (i.e., one symbol generated and displayed in an active symbol position in two reel columns and three symbols generated and displayed in active symbol positions in one reel column), the gaming device may determine that: (1) the first reel column 56*a* activates three unisymbol reels to display three symbols and the second reel column 56*b* and the third reel column 56*c* each activate one unisymbol reel to display one symbol; (2) the second reel column 56*b* activates three unisymbol reels to display three symbols and the first reel column 56*a* and the third reel column 56*c* each activate one unisymbol reel to display one symbol; or (3) the third reel column 56*c* activates three unisymbol reels to display three symbols and the first reel set 54*a* and the second reel set 54*b* each activate one unisymbol reel to display one symbol. It should be appreciated that a gaming device designer can assign different probabilities to: (a) each individual unisymbol reel of generating a symbol at an active symbol position; and/or (b) different way configurations or combinations (i.e., six ways configured as (1) two symbols generated at active symbol positions by two unisymbol reels in a first reel group and three symbols generated at active symbol positions by three unisymbol reels in a second reel group, or as (2) three symbols generated at active symbol positions by three unisymbol reels in a first reel group and two symbols generated at active symbol positions by two unisymbol reels in a second reel group).

Figure 7B:
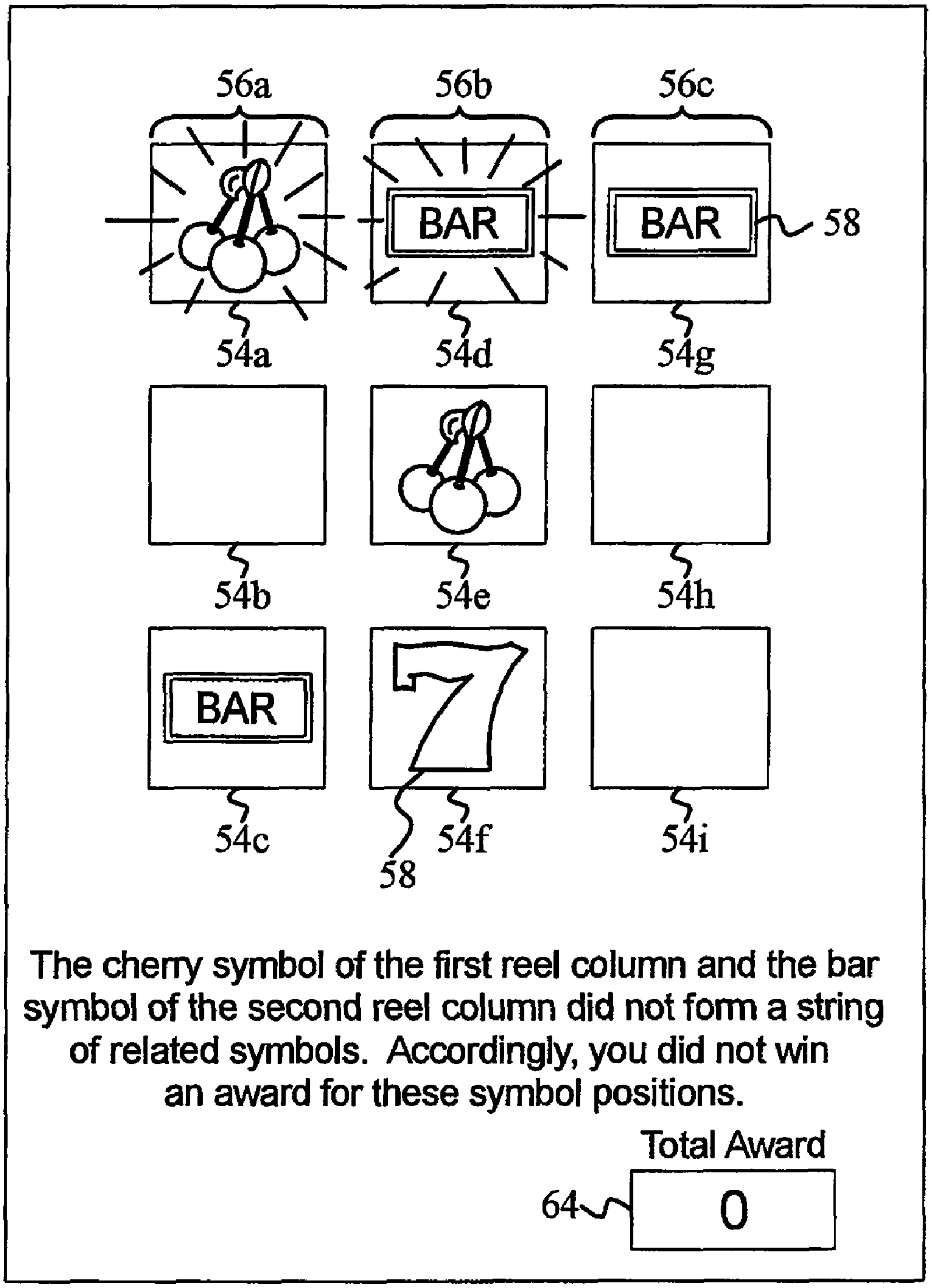
FIG. 7B is an enlarged elevation view of one embodiment of the gaming device disclosed in FIG. 7A, illustrating the gaming device determining if the first way to win is associated with an award.

It should be appreciated that the processor of the gaming device does not analyze each way to win on a way-by-way basis. However, for illustration purposes, each individual way is analyzed. Accordingly, as seen in FIG. 7B, the player's first way to win is the symbol combination of a cherry symbol generated by unisymbol reel 54*a*, a bar symbol generated by unisymbol reel 54*d* and potentially a bar symbol generated by unisymbol reel 54*g*. For this way to win, the gaming device determines that the cherry symbol generated by unisymbol reel 54*a* is not related to the bar symbol generated by unisymbol reel 54*d* and thus no string of related symbols are classified for this way to win. Accordingly, since no string of related symbols is classified for the player's first way to win, no award is provided to the player (as indicated in the total award display 64) and the analysis ends prior to the gaming device evaluating the bar symbol generated by unisymbol reel 54*g*. Appropriate messages such as "THE CHERRY SYMBOL OF THE FIRST REEL COLUMN AND THE BAR SYMBOL OF THE SECOND REEL COLUMN DID NOT FORM A STRING OF RELATED SYMBOLS. ACCORDINGLY, YOU DID NOT WIN AN AWARD FOR THESE SYMBOL POSITIONS" may be provided to the player visually, or through suitable audio or audiovisual displays.

Figure 7C:
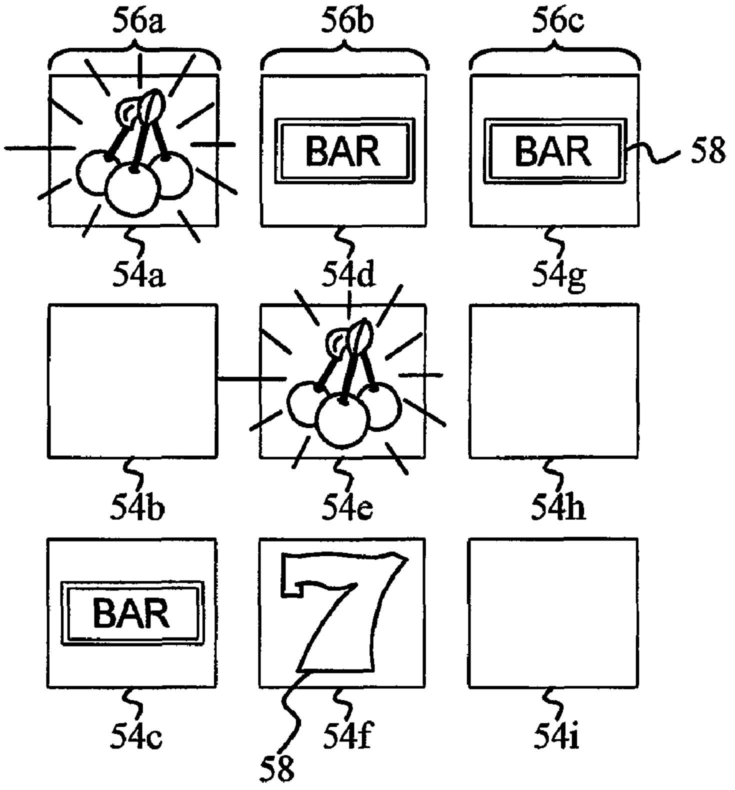
FIG. 7C is an enlarged elevation view of one embodiment of the gaming device disclosed in FIG. 7A, illustrating the gaming device determining if the second way to win is associated with an award.

As seen in FIG. 7C, the player's second way to win is the symbol combination of the cherry symbol generated by unisymbol reel 54*a*, a cherry symbol generated by unisymbol reel 54*e* and potentially the bar symbol generated by unisymbol reel 54*g*. In this case, the gaming device determined that the cherry symbol generated by unisymbol reel 54*a* is related to (i.e., forms part or all of a winning symbol combination with) the cherry symbol generated by unisymbol reel 54*e* and thus the gaming device classifies the two cherry symbols as a string of related symbols. After classifying the string of related cherry symbols, since at least one string of related symbols is incomplete and at least one unanalyzed symbol is displayed on at least one adjacent reel column, the gaming device determines whether any symbols in the next adjacent reel column need to be added to the string of related cherry symbols. In this case, since the bar symbol generated by unisymbol reel 54*g* in the next adjacent reel column is not related to the symbols of the string of related cherry symbols, the gaming device marks the string of related cherry symbols as complete. According to an appropriate paytable, the completed string of two related cherry symbols is a winning symbol combination associated with an award of fifty which is provided to the player (as indicated in the total award display 64). Appropriate messages such as "THE CHERRY SYMBOL OF THE FIRST REEL COLUMN AND THE CHERRY SYMBOL OF THE SECOND REEL COLUMN FORMED A STRING OF RELATED SYMBOLS. ACCORDINGLY, YOUR AWARD FOR THESE SYMBOL POSITIONS IS FIFTY" may be provided to the player visually, or through suitable audio or audiovisual displays.

Figure 7D:
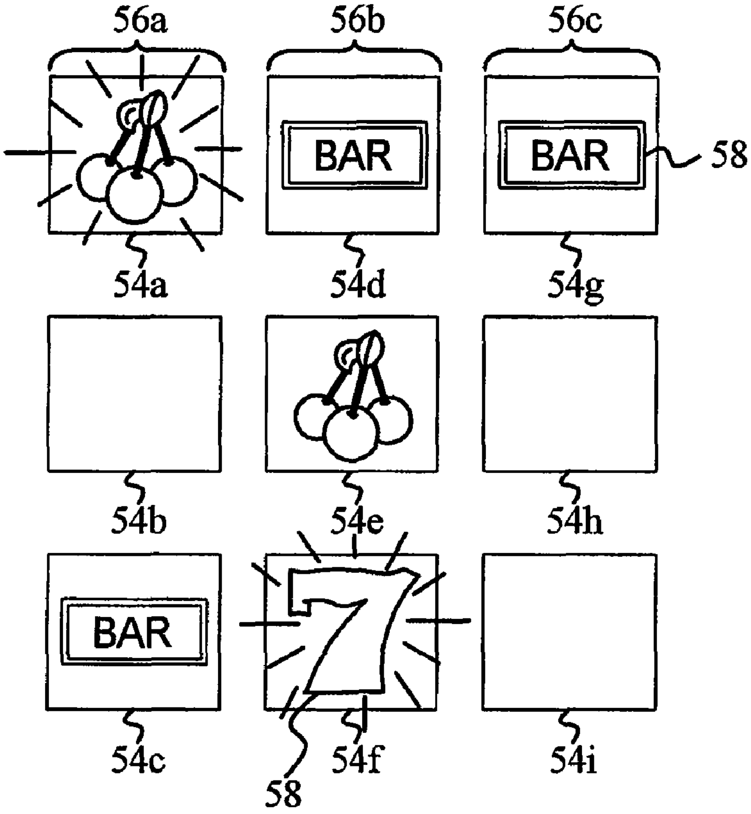
FIG. 7D is an enlarged elevation view of one embodiment of the gaming device disclosed in FIG. 7A, illustrating the gaming device determining if the third way to win is associated with an award.
Figure 7D:
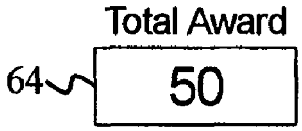

As seen in FIG. 7D, the player's third way to win is the symbol combination of the cherry symbol generated by unisymbol reel 54*a*, a seven symbol generated by unisymbol reel 54*f* and potentially the bar symbol generated by unisymbol reel 54*g*. For this way to win, the gaming device determines that the cherry symbol generated by unisymbol reel 54*a* is not related to the seven symbol generated by unisymbol reel 54*f* and thus no string of related symbols are classified for this way to win. Accordingly, since no string of related symbols is classified for the player's third way to win, no award is provided to the player. Appropriate messages such as "THE CHERRY SYMBOL OF THE FIRST REEL COLUMN AND THE SEVEN SYMBOL OF THE SECOND REEL COLUMN DID NOT FORM A STRING OF RELATED SYMBOLS. ACCORDINGLY, YOU DID NOT WIN AN AWARD FOR THESE SYMBOL POSITIONS" may be provided to the player visually, or through suitable audio or audiovisual displays.

Figure 7E:
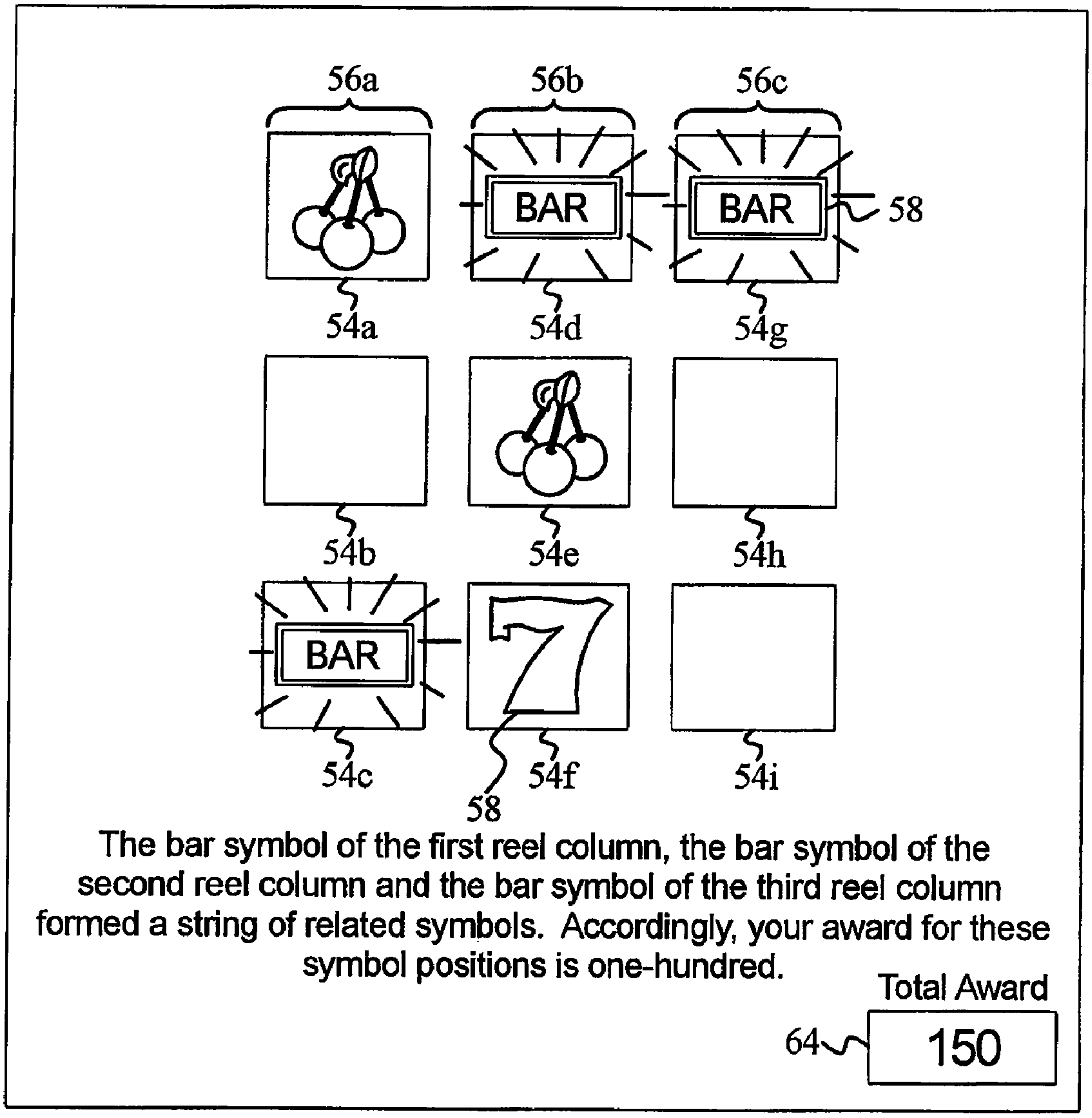
FIG. 7E is an enlarged elevation view of one embodiment of the gaming device disclosed in FIG. 7A, illustrating the gaming device determining if the fourth way to win is associated with an award.

As seen in FIG. 7E, the player's fourth way to win is the symbol combination of a bar symbol generated by unisymbol reel 54*c*, the bar symbol generated by unisymbol reel 54*d* and potentially the bar symbol generated by unisymbol reel 54*g*. For this way to win, the gaming determined that the bar symbol generated by unisymbol reel 54*c* is related to (i.e., forms part or all of a winning symbol combination with) the bar symbol generated by unisymbol reel 54*d* and thus the gaming device classifies the two bar symbols as a string of related symbols. After classifying the string of related bar symbols, since at least one string of related symbols is incomplete and at least one unanalyzed symbol is displayed in at least one adjacent reel column, the gaming device determines whether any symbols in the next adjacent reel column need to be added to the string of related bar symbols. In this case, since the bar symbol generated by unisymbol reel 54*g* in the next adjacent reel column is related to the symbols of the string of related bar symbols, the gaming device adds the bar symbol generated by unisymbol reel 54*g* to the string of related bar symbols. Since no symbols remain unanalyzed on any adjacent reel columns, the gaming device marks the string of related bar symbols as complete. According to an appropriate paytable, the completed string of three related bar symbols is a winning symbol combination associated with an award of one-hundred which is provided to the player. Appropriate messages such as "THE BAR SYMBOL OF THE FIRST REEL COLUMN, THE BAR SYMBOL OF THE SECOND REEL COLUMN AND THE BAR SYMBOL OF THE THIRD REEL COLUMN FORMED A STRING OF RELATED SYMBOLS. ACCORDINGLY, YOUR AWARD FOR THESE SYMBOL POSITIONS IS ONE-HUNDRED" may be provided to the player visually, or through suitable audio or audiovisual displays.

Figure 7F:
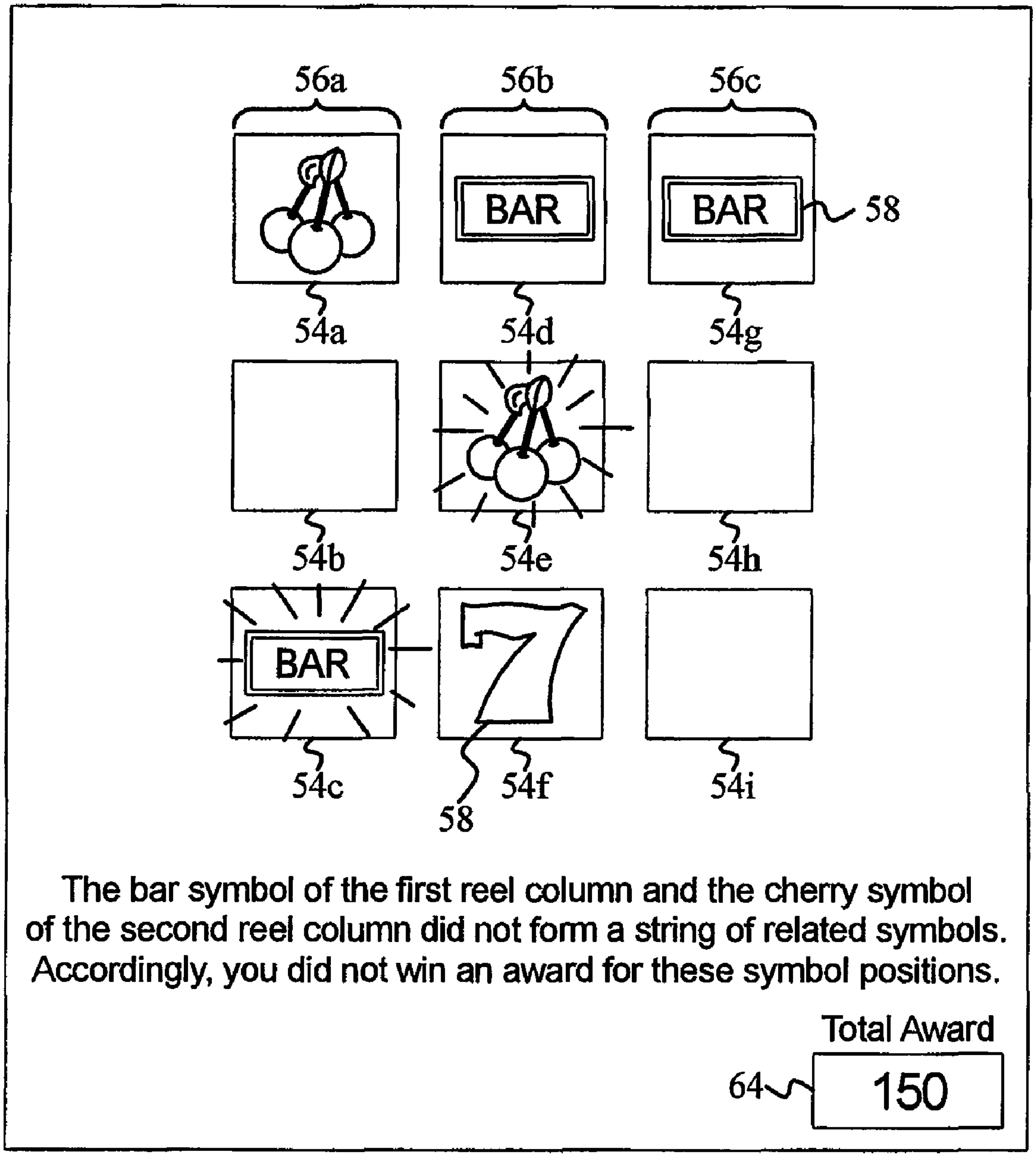
FIG. 7F is an enlarged elevation view of one embodiment of the gaming device disclosed in FIG. 7A, illustrating the gaming device determining if the fifth way to win is associated with an award.

As seen in FIG. 7F, the player's fifth way to win is the symbol combination of the bar symbol generated by unisymbol reel 54*c*, the cherry symbol generated by unisymbol reel 54*e* and potentially the bar symbol generated by unisymbol reel 54*g*. For this way to win, the gaming device determines that the bar symbol generated by unisymbol reel 54*c* is not related to the cherry symbol generated by unisymbol reel 54*e* and thus no string of related symbols are classified for this way to win. Accordingly, since no string of related symbols is classified for the player's fifth way to win, no award is provided to the player. Appropriate messages such as "THE BAR SYMBOL OF THE FIRST REEL COLUMN AND THE CHERRY SYMBOL OF THE SECOND REEL COLUMN DID NOT FORM A STRING OF RELATED SYMBOLS. ACCORDINGLY, YOU DID NOT WIN AN AWARD FOR THESE SYMBOL POSITIONS" may be provided to the player visually, or through suitable audio or audiovisual displays.

Figure 7G:
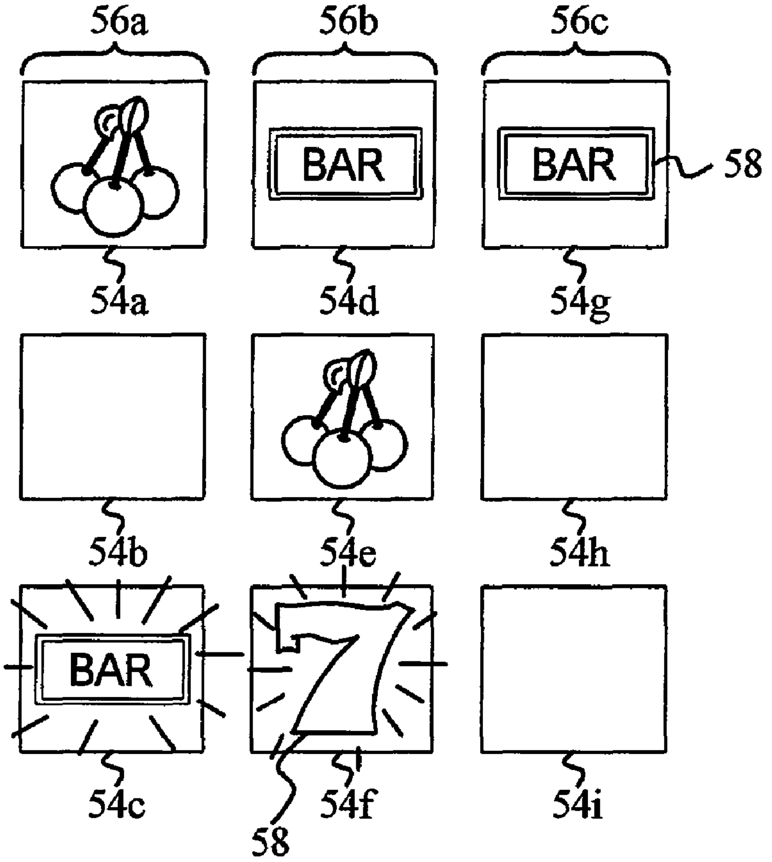
FIG. 7G is an enlarged elevation view of one embodiment of the gaming device disclosed in FIG. 7A, illustrating the gaming device determining if the sixth and final way to win is associated with an award.

As seen in FIG. 7G, the player's sixth and final way to win is the symbol combination of the bar symbol generated by unisymbol reel 54*c*, the seven symbol generated by unisymbol reel 54*f* and potentially the bar symbol generated by unisymbol reel 54*g*. For this way to win, the gaming device determines that the bar symbol generated by unisymbol reel

54*c* is not related to the seven symbol generated by unisymbol reel 54*f* and thus no string of related symbols are classified for this way to win. Accordingly, since no string of related symbols is classified for the player's sixth way to win, no award is provided to the player. Appropriate messages such as "THE BAR SYMBOL OF THE FIRST REEL COLUMN AND THE SEVEN SYMBOL OF THE SECOND REEL COLUMN DID NOT FORM A STRING OF RELATED SYMBOLS. ACCORDINGLY, YOU DID NOT WIN AN AWARD FOR THESE SYMBOL POSITIONS" may be provided to the player visually, or through suitable audio or audiovisual displays.

In another embodiment, rather than building strings of related symbols based on the symbols displayed to the player, the gaming device is operable to provide an award determination sequence which includes analyzing each occurrence of a winning symbol combination and providing the player an award for each such occurrence. In this embodiment, as described above, each winning symbol combination must include a requisite number of symbols displayed over a requisite number of reel groups. For example, each winning symbol combination must include at least three adjacent symbols displayed in three adjacent reel columns, wherein one of the reel columns is a first designated reel column. In this embodiment, if the same set of symbols may be combined for two or more winning symbol combinations, the gaming device will provide the player an award for one of the winning symbol combinations and not each of the winning symbol combinations that the set of symbols may form. For example, if five displayed cherry symbols form a winning symbol combination, the gaming device will provide the player an award for the five displayed cherry symbols, but the gaming device will not provide the player an award for the symbol combinations of three displayed cherry symbols or four displayed cherry symbols, even though such three and four cherry symbol combinations may otherwise be winning symbol combinations associated with an award and even though the symbol combinations of three displayed cherry symbols or four displayed cherry symbols may otherwise be included in other ways to win.

In another embodiment, the gaming device determines any award to provide to the player based on the number of associated symbols which are generated on the requisite number of adjacent unisymbol reels and also based on any winning symbols of winning symbol combinations which are generated on or along any active paylines. That is, in addition to analyzing the symbols generated by the unisymbol reels in each of the active symbol positions to determine if any generated string of related symbols are associated with any awards as described above, the gaming device also analyzes the symbols generated on or along one or more of the wagered on paylines to determine if any generated winning symbol or winning symbol combination are associated with any awards. In this embodiment, the gaming device provides the player any awards associated with any generated strings of related symbols and also provides the player any awards associated with any symbols generated on or along any wagered on paylines.

Figure 8:
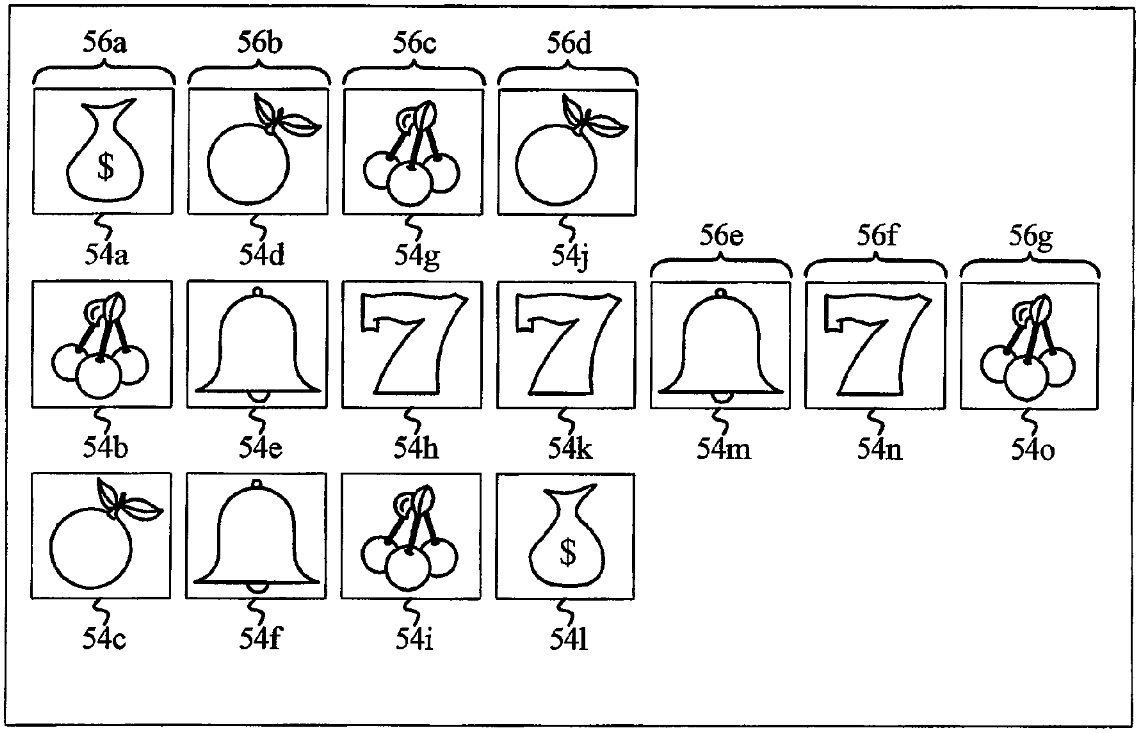
FIG. 8 is an exploded front plan view of an alternative unisymbol reel configuration including seven unisymbol reel columns with three unisymbol reels in four of the reel columns and one unisymbol reel in three of the reel columns.

FIG. 8 illustrates an alternative layout of the plurality of unisymbol reels. It should be appreciated that while this embodiment includes the same fifteen unisymbol reels FIG. 5, the layout of the unisymbol reels of FIG. 8 provides that a string of seven related symbols may be classified (as opposed to the string of five related symbols which may be classified in FIG. 5). As the probability is relatively low that the unisymbol reels will generate the appropriate symbols to form a string of seven related symbol, this alternative embodiment provides for a progressive award or another relatively large award, such as $1,000,000 or higher, to be associated with the string of seven related symbols. It should be appreciated that the wager needed to activate the unisymbol reels in reel columns 56*e* to 56*g* may be significantly less than the wager need to activate the unisymbol reels in reel columns 56*a* to 56*d*.

Figure 9:
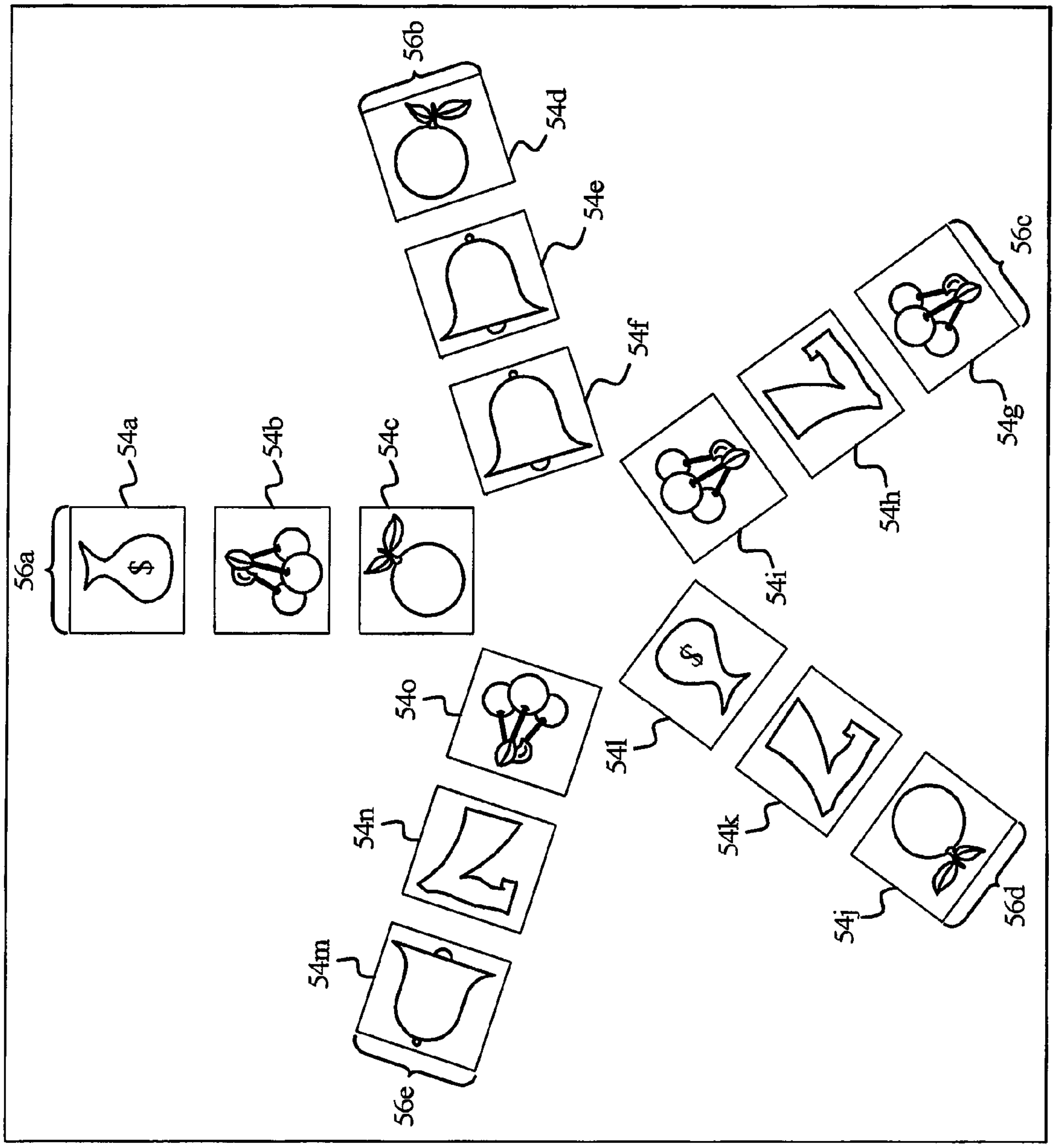
FIG. 9 is an enlarged front plan view of an alternative unisymbol reel configuration, illustrating groups of unisymbol reels positioned along the intersections of radius lines and concentric circles.

FIG. 9 illustrates another alternative layout of the plurality of unisymbol reels. In this embodiment, the groups of unisymbol reels are positioned along the intersections of radius lines and concentric circles. This alternative layout includes fifteen independent unisymbol reels 54*a* to 54*o*, each of which is included in one of five groups of unisymbol reels 56*a* to 56*e*. This embodiment proceeds with building strings of related symbols as described above. It should be appreciated that any suitable pattern or layout of unisymbol symbol generators may be employed.

In another embodiment (not shown), the gaming device disclosed herein utilizes a combination of dependent reels and independent reels. In this embodiment, in addition to a plurality of unisymbol reels which each generate a symbol at a symbol position, the gaming device includes one or more dependent or conventional reels which each generate a plurality of symbols at a plurality of symbol positions. In different embodiments, the number of dependent reels which each generate symbols is predetermined, randomly determined, determined based on the player's status (such as determined through a player tracking system), determined based on a random determination by the central controller, determined based on a random determination at the gaming machine, determined based on one or more side wagers placed, determined based on the player's wager, determined based on time (such as the time of day) or determined based on any other suitable method or criteria.

As described above, the present disclosure provides a ways to win gaming device which utilizes a plurality of unisymbol reels to provide that the gaming device is adapted to generate the requisite symbols such that a player may win on each of the ways to win the player wagered on, regardless of the number of ways which the player wagers to win on. That is, unlike a ways to win gaming devices with multi-symbol reels wherein the only way to win all 243 ways is for all of the fifteen generated symbols to be identical (which is not feasible on a standard reel strip configuration because of spacing and probability considerations described above), the utilization of unisymbol reels provides that a player may actually win on each of the wagered on ways. In this embodiment, as each unisymbol reel generates symbols independent of the other unisymbol reels and as each unisymbol reel is adapted to generate the same symbols, the plurality of unisymbol reels may each simultaneously generate the same symbol and thus a player may win on each wagered on way to win. By implementing an independent or unisymbol reel configuration in a ways payout, the player's bet or wager is maximized because it is possible for the player to win on all 243 ways, as the reels are independent of each other and thus all combinations of symbols are possible. In other words, the unisymbol or independent reels have the capability of generating symbols in a manner that allows a player to achieve winning ways that are just not possible or feasible on a standard reel configuration.

As further described above, the present disclosure provides a ways to win gaming device which utilizes a plurality of unisymbol reels to provide that a ways to win gaming device with a non-linear betting scheme does not result in substantially different average expected payout percentages for the different wager amounts. That is, since certain unisymbol reels only generate symbols when the number of wagered on ways reaches or exceeds a designated amount and the average expected payout percentage is different when the number of wagered on ways reaches or exceeds a designated amount, the unisymbol reels which only generate symbols when the number of wagered on ways reaches or exceeds a designated amount are altered, modified or otherwise designed with appropriate symbol configurations to ensure that the average expected payout for each different number of wagered on ways is substantially equal. In other words, by using independent or unisymbol reels, the probabilities associated with the unisymbol reels may be designed to provide an even payout percentage regardless of whether or not the betting scheme is linear.

For example, referring to FIG. 5, unisymbol reel 54*i* in the third reel column 56*c* will only be activated to generate a symbol when the player wagers seven credits on twenty-seven ways to win. Moreover, as illustrated in the example described above, a player's wager of seven credits on twenty-seven ways to win has a substantially different average expected payout percentage (e.g., 116.2446%) than the average expected payout percentage associated with the other wager amounts (e.g., 90.4125%). Accordingly, the symbol configuration or probabilities associated with the symbols of the unisymbol reel 54*i* in the third reel column 56*c* associated with the unisymbol of the third reel column are altered or otherwise modified, such as increasing the probability that lower paying symbols may be generated by this unisymbol reel, to bring down the overall payout percentage when seven credits are wagered. Such alterations ensure that the average expected payout for a seven credit wager is more in line with the average expected payouts of the other wager amounts. It should be appreciated that by utilizing unisymbol or independent reels, the disclosed gaming device provides for the modification of the layout and distribution of the symbols associated with unisymbol reel 54*i* in reel column 56*c* without altering the layout and distribution of the other unisymbol reels in reel column 56*c*.

As further described above, the present disclosure provides a ways to win gaming device which utilizes a plurality of unisymbol reels to provide that a ways to win gaming device wherein the reel payouts match throughout all of the different types of layouts and all of the different numbers of ways to win. In one embodiment, the present disclosure enables a gaming device designer to put more or less designated symbols on one or more unisymbol reels of one or more reel groups to accommodate for the lost pays created by any overwritten strings of symbols. That is, the gaming device is designed such that different unisymbol reels in different reel groups have different symbols or associated symbol probabilities. In other words, because as strings of related symbols are formed and previous formed strings of related symbols are overwritten, the gaming device designer compensates for these overwritten strings of symbols by modifying the chances that one or more strings of symbols may be formed. For example, because a string of four cherry symbols overwrites a previous formed string of three cherry symbols, a gaming device designer may include more cherry symbols on one or more of the unisymbol reels of the third reel group. In this embodiment, more cherry symbols in the third reel group creates more three cherry symbol strings and thus compensates for the lost pays created when any three cherry symbol strings are overwritten as four cherry symbol strings.

In another embodiment, rather than increasing or decreasing the number of designated symbols on one or more unisymbol reels of one or more unisymbol reel groups, a gaming device designer may modify or alter the probabilities associated with the existing symbols to increase or decrease the occurrences that designated symbols are generated and thus accommodate for any overwriting of previously formed strings of symbols. For example, because a string of three cherry symbols overwrites a previous formed string of two cherry symbols, a gaming device designer may increase the probabilities that the cherry symbols on one or more of the unisymbol reels of the second reel group will be generated. In this example, an increased probability of cherry symbols generated on unisymbol reels of the second reel group increases the chances that more two cherry symbol strings will be formed and thus compensates for the lost pays created when any two cherry symbol strings are overwritten as three cherry symbol strings.

In another embodiment, a gaming device designer may make the reel payouts match throughout all of the different types of layouts and all of the different numbers of ways by employing different unisymbol reels or unisymbol reel configurations for different wager amounts. In this embodiment, depending on the number of ways wagers on, the gaming device utilizes certain unisymbol reels in certain unisymbol reel configurations to control the different symbol combinations possible and thus control the payouts. In this embodiment, the gaming device may alter or otherwise modify which unisymbol reels are used in each reel group to ensure that the reel payouts match throughout all of the different types of layouts and all of the different numbers of ways to win. Accordingly, the gaming device disclosed herein uses independent reels in a ways to win gaming device to allow the gaming device designer maximum freedom in accomplishing this, as changes on one reel would not effect the symbol layouts of any other reels. The gaming device designer could thus modify each reel individually such that the reel payouts match throughout all of the different types of layouts and all of the different numbers of ways to win.

Figures 4B, 4C:
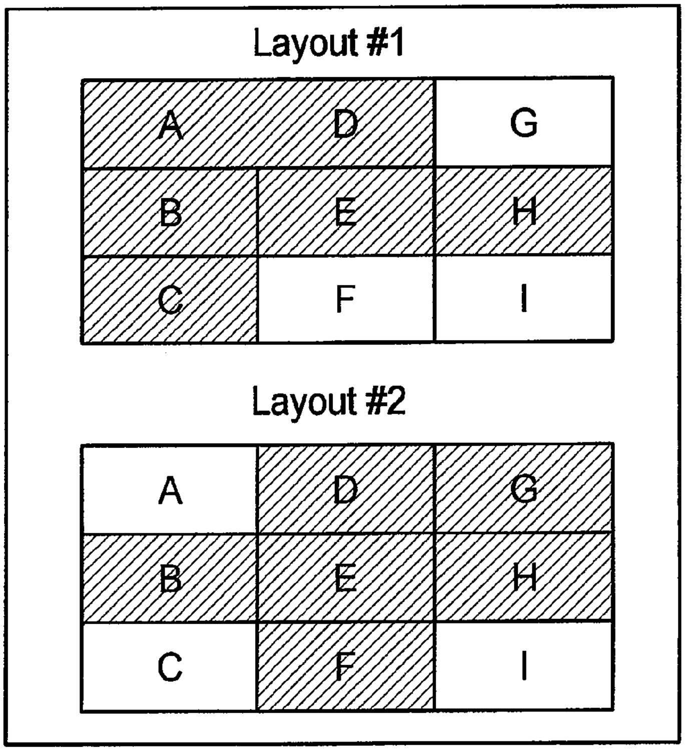
FIGS. 4B, 4C, 4D, 4E, 4F, 4G and 4H are tables and equations illustrating different reel layouts and payback percentages for a ways to win gaming device.
Figure 4D:
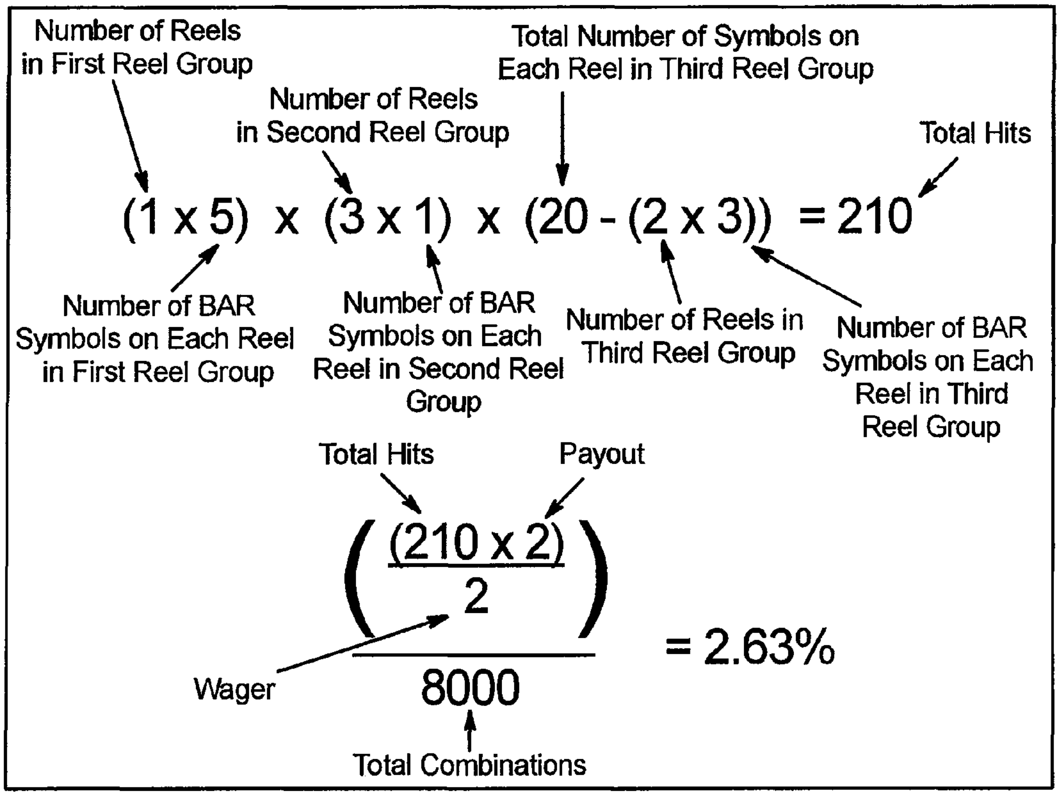
Figure 4E:
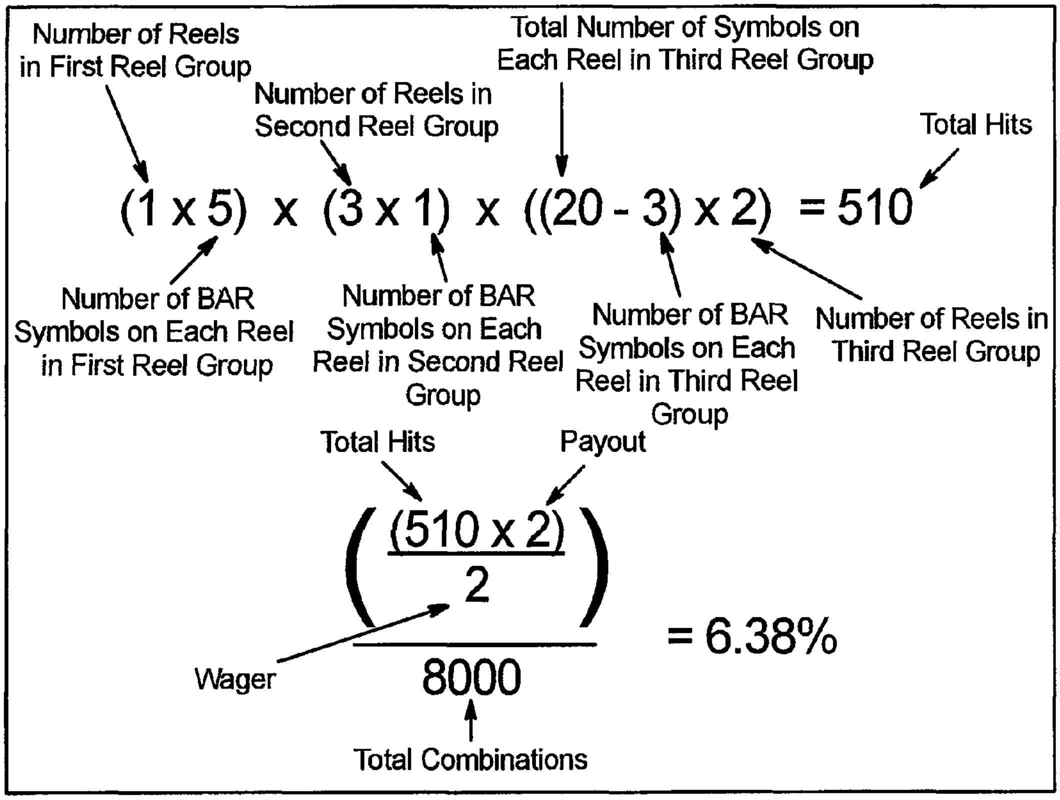
Figure 4F:
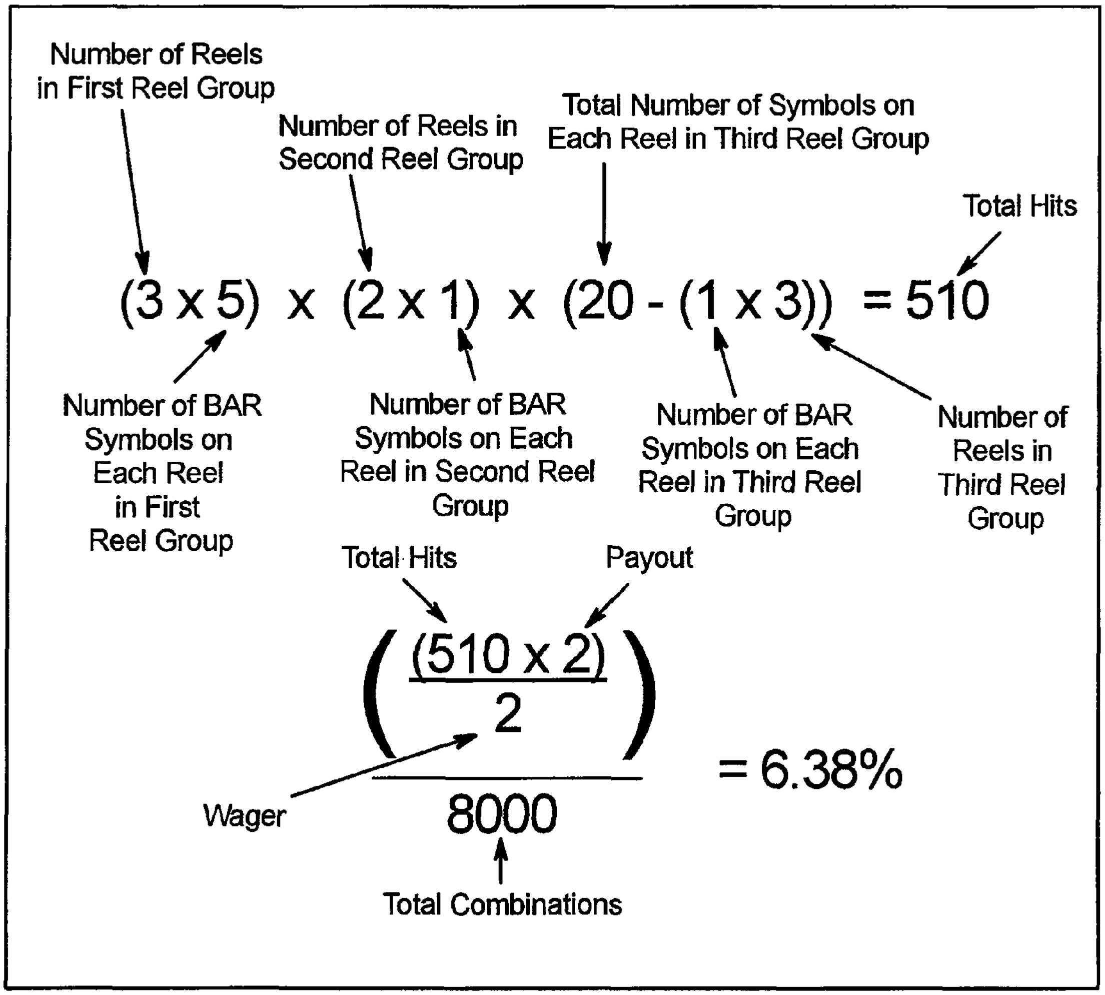
Figures 4G, 4H:
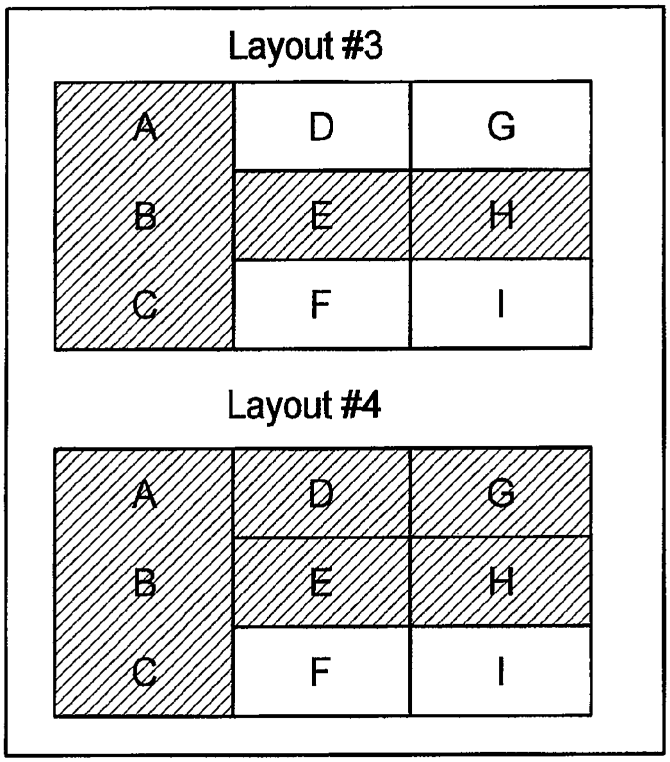

As indicated above, in one embodiment, the gaming device designer may weigh or otherwise assign probabilities to the reels to be selected. As described above in the Summary section and illustrated in FIGS. 4B and 4C, Layout #1 and Layout #2 both provide the player with 6 ways to win and Layout #1 pays out the desired payout while the payout for Layout #2 is much lower than desired. Accordingly, the gaming device designer may weight the reel selection such that Layout #1 is chosen 95% of the time and Layout #2 is chosen 5% of the time. This would result in an average expected payout percentage of $(6.38\times0.95)+(2.65\times0.05)=6.19\%$ which is more consistent with the desired average expected payout (while still ensuring that all possible reel combinations have the potential of being used).

In another embodiment, because of the individual unisymbol reels, the gaming device designer alters the layout of the symbols on the individual unisymbol reels, such as adding or removing symbols, replacing symbols, or any other alterations necessary, to balance out the probability.

In one embodiment, the gaming device designer changes the distribution of all reels in a set. In the BAR symbol example described in the Summary above, the gaming device designer may alter the distribution of the BAR symbols and add one or more blanks to make the payout percentages for each layout more consistent. For example, the gaming device designer could format the independent reels as seen in FIG. 6B.

Figure 6C:
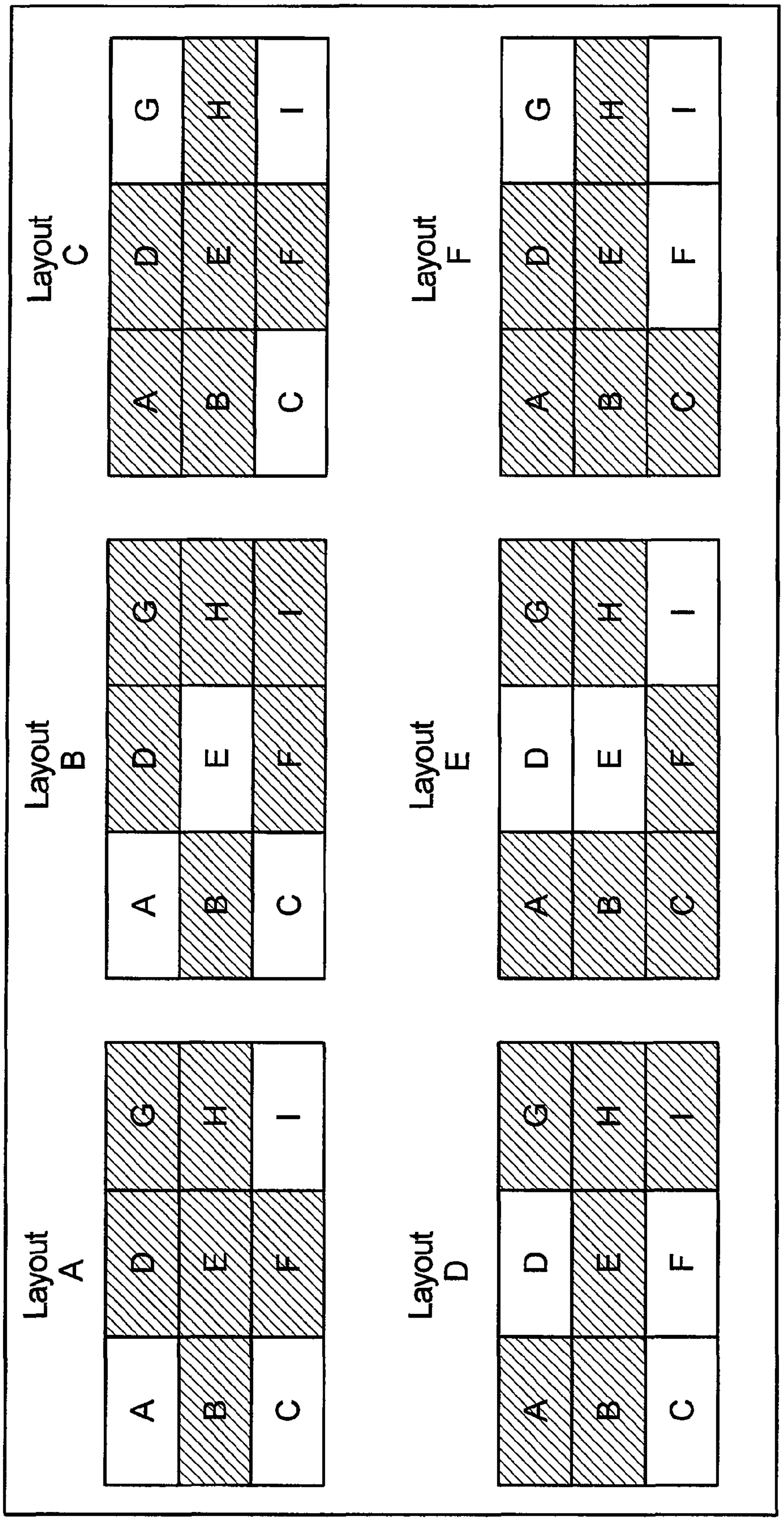

As is apparent, the number of symbols on the independent reels in the second set has increased to 22 due to the addition of the extra BAR symbols. In this embodiment, blanks were added to the other reel sets to help even out the discrepancy in probabilities. The addition symbols or blanks changes the total symbol combinations to 10648 ($22^3$). To illustrate how this additional symbol affects the payouts for the BAR symbol combinations, FIG. 6C shows all the different permutations of how to present 6 ways to win. It should be appreciated that to simplify manners, only one example of each permutation is illustrated because in this example, all reels in each reel group have the same symbol layout.

Using the formulas described above, FIG. 6D illustrates the payout percentages for each of these ways with the additional symbols added to the unisymbol reels in the second reel group and the additional blanks added to the unisymbol reels of the remaining reel groups.

As can be seen in FIG. 6D, the payout percentages for the 3 Bar symbol combinations remain the exact same. However, the 2 Bar symbol combinations are still inconsistent, but much closer to each other. With this new symbol distribution, the desired average expected payout percentage is calculated to be (126/10648) or 1.183% which results in a payout percentage of 3.550% (3 ways for each coin wagered). As is shown in FIG. 6D, Layout C and Layout F match the desired average expected payout and Layouts A, B, D, and E are inconsistent with the desired average expected payout. However, because the independent reels format allows for the symbol distribution on separate reels to be changed without the dependency limitations of a dependent reel, Layouts A, B, D, and E are much closer to the desired average expected payout than in the previous illustrated case. It should be appreciated that the reels may be reconfigured in any suitable positions as long as the reels are analyzed consistently. That is, the symbols in any group may be modified so long as the ways to win which are analyzed remain consistent. For example, if the symbols in any group are appropriately modified, the symbols may be analyzed in a top-to-bottom fashion, a bottom-to-top fashion, a left-to-right fashion, a right-to-left fashion or any other suitable fashion.

It should be appreciated that because the above-described embodiment still results in a slight discrepancy in the payout percentages, in one embodiment, the above-described manner is combined with the manner of weighing symbol layouts as disclosed above to further aid in the payout percentages becoming more consistent. For example, Layouts D and F could be chosen 80% of the time, Layouts A and E could be chosen 15% of the time and Layouts B and C could be chosen 5% of the time resulting in an average expected payout of $(3.55*0.85)+(1.69\times0.10)+(1.07\times0.05)=3.24\%$. It should be appreciated that any desired weighted combination may be used by the gaming device designer to help even out the payout percentage to a value that is acceptable.

In another embodiment, as indicated above, one or more reels are each altered individually. As noted above, the discrepancy in probability is often a result of two symbol combinations occurring that are not getting paid due to an override by a three symbol combination. Analyzing the equation, this is shown to be a result of the $(20-(X*Y))$ computation where X is the number of symbols on the unisymbol reel and Y is the number of unisymbol reels in the unisymbol reel group. For two symbols on the last reel, this could result in the following discrepancy: with one reel in the reel group, the result would be 18, with two reels in the reel group, the result would be 16 and with three reels in the reel group, the result would be 14. As can be seen, this is a significant difference when considering the outcome of the equation. Thus, a gaming device designer may alter these unisymbol reels as to bring the numbers more consistent with each other. In one embodiment, this includes lowing the number of BAR symbols on two of the unisymbol reels in the last unisymbol reel group. For example, the gaming device designer formats the independent reels as seen in FIG. 6E (wherein the parenthesis indicate the different distributions for the different reels (named R31/R32/R33) in the reel group).

Figure 6F:
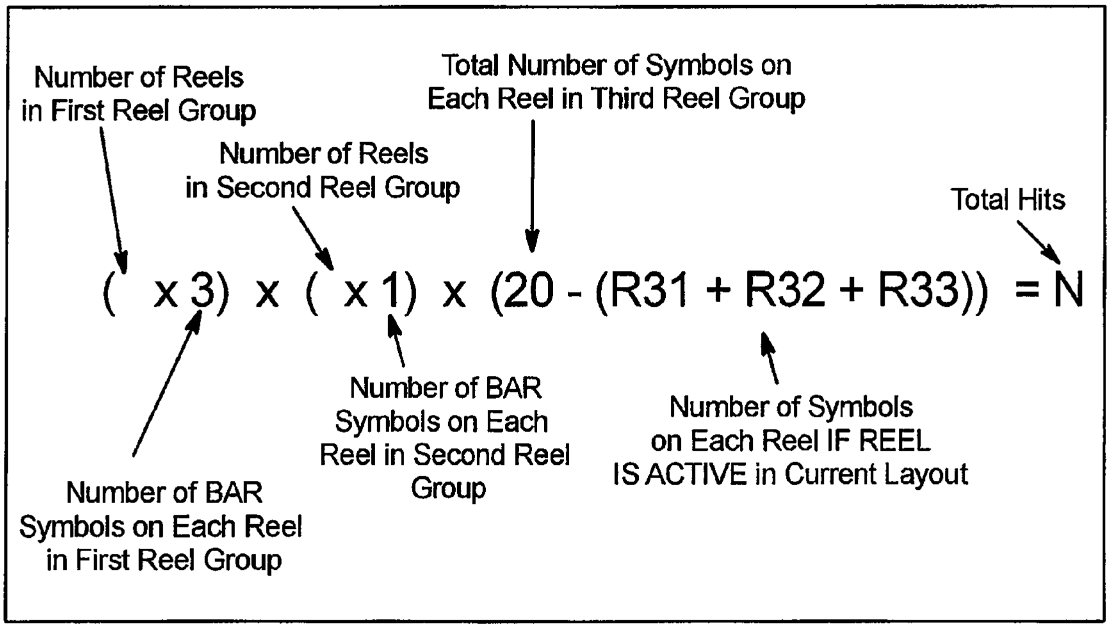

Using the same reel layouts described above and the modified equation of FIG. 6F, result in the payout percentages for each layout as seen in FIG. 6G.

It should be appreciated that while these payout percentages are still not consistent; however, they are now linear and could be more easily weighted to occur at a relationship and frequency the gaming device designer desires. It should be further appreciated that one disadvantage of this method is the altering of the payout percentages for the 3 BAR symbol combinations because the distribution is no longer uniform in the third reel set. In one embodiment, the gaming device designer modifies the distribution among any of the unisymbol reels with any of the symbols to further guide the payout percentages to be more consistent with each other. In another embodiment, the gaming device designer ensures the combinations occur by providing that the selection of the unisymbol reels occurs in a certain manner (i.e. if any symbol combination that only has one unisymbol reel in the last unisymbol reel group is selected, providing the reel H is selected as it contains the 3 symbols).

Though the payout percentages are still not equivalent, it should be appreciated that the modification of the independent reels allows the payout percentages to be much closer to equivalent. For example, the mathematical relationship between Layout #1 and Layout #2 has that payout percentage of Layout #1 being 2.43 times the payout percentage of Layout #2. The same configurations are represented in the alteration example by Layout F and Layout A. By implementing the symbol modifications, the percentages from the same configuration changed as follows: In the first example, Layout F was 2.07 times Layout A. In the second example, Layout F was 2.00 times Layout A. Thus, both methods showed marked improvement in getting the payout percentages more equivalent and in combination with the ability to weight which configurations are chosen, would allow the gaming device designer maximum flexibility in implementing a ways to win gaming device that allows for approximately the same payouts among all different ways. It should be appreciated that the above-described examples are the first stage in the process a gaming device designer may follow in equating the payout percentages throughout all of the different types of ways to win layouts and all of the different numbers of ways to win. It should be further appreciated that while the payout percentages illustrated in the these examples do not equate, one skilled in the art can determine the appropriate probabilities and payouts such that the payout percentages equate throughout all of the different types of ways to win layouts and all of the different numbers of ways to win.

As further illustrated in FIGS. 10A and 10B, in one embodiment, utilizing unisymbol reels to incorporate different symbol layouts in each position of each reel column enables a gaming device designer greater flexibility in designing and controlling the appearance of one or more symbol combinations. That is, a gaming device designer is enabled to modify or change the layout of any position in any reel column without otherwise affecting the other positions of any other reel column.

As discussed above, it is advantageous in a ways to win gaming device that the non-linear betting scheme does not result in substantially different average expected payout percentages for the different wager amounts. As shown in FIGS. 10A and 10B, this is achieved through the utilization of unisymbol reels. In the unisymbol reel layout of FIG. 10B, there is a relatively small range of hit frequencies between a player wagering on 1 way to win and a player wagering on 27 ways to win. This small range of hit frequencies results in a relatively small range in payback percentages between the different wagers on the two different numbers of ways to win. For example, this is only a 40% difference in the hit frequency and a 4.055% difference in the payback percentage when comparing a player wagering on 1 way to win and a player wagering on 27 ways to win. This improvement over the dependent reel example described above is the result of the gaming device designer's ability to change the reel strip layout of one unisymbol reel without otherwise affecting any other symbols in that reel column or their associated hit frequency. For example, the gaming device designer is enabled to remove a cherry symbol from the middle position of column 1 without any affect on the unisymbol reels at the top position and the bottom position of column 1. Accordingly, the gaming device designer's opportunities to modify the symbol combinations are not limited by the physical dependency of the reel itself.

As further seen in FIGS. 10A and 10B, in one embodiment, not all of the available numbers of ways to win result in the same symbol combination associated with the highest contribution to the total payback. For example, a wager on 1 way to win has the CH-CH-xx symbol combination as its highest contributor, a wager on 3 ways to win has the 1B-1B-1B symbol combination as its highest contributor, a wager on 9 ways to win has the 1B-1B-1B symbol combination and the R7-R7-R7 symbol combination as high contributors, and a wager on 27 ways to win has the R7-R7-R7 symbol combination as its highest contributor. This embodiment enables a gaming device designer to focus different parts of the gaming device to different wagered on numbers of ways to win. In one example, if the gaming device designer wants to lower the payback percentage of the wager on 27 ways to win, the gaming device designer is enabled to lower the payout associated with the R7-R7-R7 symbol combination (due to the R7-R7-R7 symbol combination's high contribution rate for this wager level), such as by lowering the payout associated with the R7-R7-R7 combination to 95. In this example, the result is the range between the wagers is decreased and the payback percentages are now: 1 way to win: 87.605%, 3 ways to win: 87.896%, 9 ways to win: 88.597%, and 27 ways to win: 90.186%. This modification (which focused on lowering the payback percentage of the wager for 27 ways to win) results in a difference among the average expected payouts equal to 2.581%.

Accordingly, as the utilization of unisymbol reels enable different parts of the gaming device to focus on different wagers, a small change to a payout enables a gaming device designer to modify payback percentages. That is, the gaming device designer is enabled to focus the payout change on a specific bet level due to different symbol combinations focused on different wagers. Thus, unisymbol reels provide a gaming device designer the ability to customize each bet level to control hit frequency and to adapt focused payouts to control expected payout percentages.

In another embodiment, a gaming device designer analyzes the independent reels as above for each reel, reel set, or combination in order to further make the payout percentages even more equivalent. The gaming device designer could add or delete symbols as needed, route the ways to win as required or weight the configurations in such a way that the combinations adhered to the desired expected payout. This flexibility is provided by the independent reels and is just not plausible with dependent reels as dependent reels have a fixed symbol set and adding or deleting a symbol in one position causes a modification to a symbol in another position.

In one embodiment, the ways to win gaming device is designed such that the one or more unisymbol reels in one or more reel columns each include a designated symbol configuration and one or more unisymbol reels in one or more unisymbol reel columns each include an altered or modified symbol configuration. It should be appreciated that any suitable alteration or modification of the unisymbol reel configurations may be occur. Such modification enables a gaming device designer to easily implement any betting scheme and alter the configuration of the independent reels where discrepancies in payouts occur to ensure that the payout percentages remain consistent.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device configured to operate under control of a processor, said gaming device comprising:

a plurality of reels arranged in a plurality of reel columns, each reel including a plurality of symbols, wherein at least one of said reel columns includes a plurality of said reels and each reel is adapted to be selectively activated by the processor; and at least one input device;

wherein the processor is configured to operate with the at least one input device and the plurality of reels to:

(a) receive a wager associated with a number of reels greater than one, wherein different wagers are associated with different numbers of reels;

(b) for each wagered on reel, generate and display one of said symbols of said reel at an active symbol position;

(c) identify each of the symbols at active symbol positions for a first of said reel columns and a second of said reel columns;

(d) determine if any of said identified symbols for the first reel column are related to any of said identified symbols for the second reel column, wherein each occurrence of related symbols forms a string of related symbols;

(e) for each string of related symbols:

(i) determine if any symbols displayed at active symbol positions in an adjacent reel column are related to the symbols which form said string of related symbols, (ii) if one of said symbols in the adjacent reel column is related to the symbols which form said string of related symbols, add said related symbol to said string of related symbols, (iii) if any other of said symbols in the adjacent reel column are related to the symbols which form said string of related symbols, form an additional string of related symbols for each of the other related symbols, (iv) if none of said symbols in the adjacent reel column are related to the symbols which form said string of related symbols, designate said string of related symbols as complete;

(f) repeat (e) until either each of the strings of related symbols is complete or there are no additional reel columns adjacent to the last reel column which includes one of the related symbols; and (g) provide to a player any awards based on any strings of related symbols which correspond with at least one winning combination of said symbols.

2. The gaming device of claim 1, wherein at least two reels each include different symbols.

3. The gaming device of claim 1, wherein at least two reels in at least two different reel columns each include different symbols.

4. The gaming device of claim 1, wherein for at least two reels, a plurality of probabilities associated with the symbols of said reel are different.

5. The gaming device of claim 1, wherein for at least two reels in at least two different reel columns, a plurality of probabilities associated with the symbols of said reel are different.

6. The gaming device of claim 1, wherein each received wager is associated with substantially the same average expected payout percentage.

7. The gaming device of claim 1, wherein a first wager amount associated with a first number of said reels is non-linearly related to a second wager amount associated with a second number of said reels.

8. The gaming device of claim 1, wherein said plurality of reels include a plurality of unisymbol reels.

9. A gaming device configured to operate under control of a processor, said gaming device comprising:

a plurality of reels arranged in a plurality of reel columns, each reel including a plurality of symbols, wherein at least one of said reel columns includes a plurality of said reels and each reel is adapted to be selectively activated by the processor; and at least one input device;

wherein the processor is configured to operate with the at least one input device and the plurality of reels to:

(a) receive a wager associated with a number of reels, said number being greater than one, wherein different wagers are associated with different numbers of reels;

(b) for each wagered on reel, generate and display one of said symbols of said reel at an active symbol position;

(c) identify each of the symbols at active symbol positions for a first of said reel columns and a second of said reel columns;

(d) determine if any of said identified symbols for the first reel column and any of said identified symbols for the second reel column are at least part of one of a plurality of winning combinations of said symbols, wherein each occurrence of symbols which are at least part of one of said winning combinations of symbols forms a string of symbols;

(e) for each string of symbols which forms at least part of one of said winning combinations of symbols:

(i) determine if any symbols displayed at active symbol positions in an adjacent reel column and the symbols which form said string of symbols are at least part of one of said winning combinations of symbols, (ii) if one of said symbols in the adjacent reel column and the symbols which form said string of symbols are at least part of one of said winning combinations of symbols, add said symbol in the adjacent reel column which are at least part of one of said winning combinations of symbols to said string of symbols, (iii) if any other of said symbols in the adjacent reel column and the symbols which form said string of symbols are at least part of one of said winning combinations of symbols, form an additional string of symbols for each of the other symbols which are at least part of one of said winning combinations of symbols, (iv) if none of said symbols in the adjacent reel column and the symbols which form said string of symbols are at least part of one of said winning combinations of symbols, designate said string of symbols as complete;

(f) repeat (e) until either each of the strings of symbols is complete or there are no additional reel columns adjacent to the last reel column which includes one of the symbols which is at least part of one of said winning combinations of symbols; and (g) provide to a player any awards based on any strings of symbols which correspond with said winning combinations of symbols.

10. The gaming device of claim 9, wherein at least two reels each include different symbols.

11. The gaming device of claim 9, wherein at least two reels in at least two different reel columns each include different symbols.

12. The gaming device of claim 9, wherein for at least two reels, a plurality of probabilities associated with the symbols of said reel are different.

13. The gaming device of claim 9, wherein for at least two reels in at least two different reel columns, a plurality of probabilities associated with the symbols of said reel are different.

14. The gaming device of claim 9, wherein each received wager is associated with substantially the same average expected payout percentage.

15. The gaming device of claim 9, wherein a first wager amount associated with a first number of said reels is non-linearly related to a second wager amount associated with a second number of said reels.

16. The gaming device of claim 9, wherein said plurality of reels include a plurality of unisymbol reels.

17. A gaming device configured to operate under control of a processor, said gaming device comprising:

a plurality of reels arranged in a plurality of reel columns, wherein at least one of said reel columns includes a plurality of said reels and each reel is adapted to be selectively activated by the processor; and at least one input device;

wherein the processor is configured to operate with the at least one input device and the plurality of reels to:

(a) receive a wager amount greater than one;

(b) determine a number of said reels to activate based on said received wager amount, wherein different wager amounts are associated with different numbers of reels to activate;

(c) activate each of said determined number of reels;

(d) for each activated reel, generate and display one of a plurality of symbols at an active symbol position, wherein each reel includes a plurality of said symbols;

(e) determine if any of said symbols displayed at any active symbol positions for a requisite number of adjacent reels form a string of related symbols, wherein each formed string of related symbols includes one generated symbol for each reel column and said requisite number of adjacent reels is at least two; and (f) provide to a player any awards based on any determined strings of related symbols.

18. The gaming device of claim 17, wherein at least two reels each include different symbols.

19. The gaming device of claim 17, wherein at least two reels in at least two different reel columns each include different symbols.

20. The gaming device of claim 17, wherein for at least two reels, a plurality of probabilities associated with the symbols of said reel are different.

21. The gaming device of claim 17, wherein for at least two reels in at least two different reel columns, a plurality of probabilities associated with the symbols of said reel are different.

22. The gaming device of claim 17, wherein each received wager is associated with substantially the same average expected payout percentage.

23. The gaming device of claim 17, wherein a first wager amount associated with a first number of said reels to activate is non-linearly related to a second wager amount associated with a second number of said reels to activate.

24. The gaming device of claim 17, wherein said plurality of reels include a plurality of unisymbol reels.

25. A gaming device configured to operate under control of a processor, said gaming device comprising:

at least one input device;

at least one display device; and at least one memory device which stores a plurality of instructions, which when executed by the processor, cause the processor to operate with the at least one display device and the at least one input device to:

(a) display a plurality of reels arranged in a plurality of reel columns, each reel including a plurality of symbols, wherein at least one of said reel columns includes a plurality of said reels and each reel is adapted to be selectively activated by the processor;

(b) enable a player to wager one of a plurality of different receivable wager amounts, wherein based on one of the received wager amounts, a plurality of reels are activated to each generate one of said symbols at an active symbol position of one of said reel columns; and (c) provide an award to the player, wherein the award is based on any strings of related symbols which are formed from any of the symbols generated at active symbol positions.

26. The gaming device of claim 25, wherein at least two reels each include different symbols.

27. The gaming device of claim 25, wherein at least two reels in at least two different reel columns each include different symbols.

28. The gaming device of claim 25, wherein for at least two reels, a plurality of probabilities associated with the symbols of said reel are different.

29. The gaming device of claim 25, wherein for at least two reels in at least two different reel columns, a plurality of probabilities associated with the symbols of said reel are different.

30. The gaming device of claim 25, wherein each receivable wager amount is associated with substantially the same average expected payout percentage.

31. The gaming device of claim 25, wherein a first of the wager amounts associated with a first number of said reels to activate is non-linearly related to a second of said wager amounts associated with a second number of said reels to activate.

32. The gaming device of claim 25, wherein said plurality of reels include a plurality of unisymbol reels.

33. A gaming device configured to operate under control of a processor, said gaming device comprising:

a plurality of reels arranged in a plurality of reel columns, wherein at least one of said reel columns includes a plurality of said reels and each reel is adapted to be selectively activated by the processor; and at least one input device;

wherein the processor is configured to operate with the at least one input device and the plurality of reels to:

(a) receive one of:

(i) a first receivable wager amount greater than one, said first receivable wager amount associated with a first number of said reels to activate;

(ii) a second receivable wager amount greater than one, said second receivable wager amount associated with a second number of said reels to activate, wherein the second receivable wager amount is greater than the first receivable wager amount and the second number of said reels to activate is greater than and non-linearly related to the first number of said reels to activate;

(b) activate each of said number of reels associated with the received wager amount;

(c) for each activated reel, generate and display one of a plurality of symbols at an active symbol position, wherein each reel includes a plurality of said symbols;

(d) determine if any of said symbols displayed at any active symbol positions for a requisite number of adjacent reels form a string of related symbols, wherein each formed string of related symbols includes one generated symbol for each reel column and said requisite number of adjacent reels is at least two; and (e) provide to a player any awards based on any determined strings of related symbols.

34. The gaming device of claim 33, wherein at least two reels each include different symbols.

35. The gaming device of claim 33, wherein at least two reels in at least two different reel columns each include different symbols.

36. The gaming device of claim 33, wherein for at least two reels, a plurality of probabilities associated with the symbols of said reel are different.

37. The gaming device of claim 33, wherein for at least two reels in at least two different reel columns, a plurality of probabilities associated with the symbols of said reel are different.

38. The gaming device of claim 33, wherein each received wager amount is associated with substantially the same average expected payout percentage.

39. The gaming device of claim 33, wherein said plurality of reels include a plurality of unisymbol reels.

40. A method of operating a gaming device, said method comprising:

(a) receiving a wager associated with a number of reels greater than one, wherein said reels are arranged in a plurality of reel columns, each reel includes a plurality of symbols, at least one of said reel columns includes a plurality of said reels, each reel is adapted to be selectively activated and different wagers are associated with different numbers of reels;

(b) for each wagered on reel, causing at least one processor to execute a plurality of instructions to display one of said symbols of said reel at an active symbol position;

(c) causing the at least one processor to execute the plurality of instructions to identify each of the symbols at active symbol positions for a first of said reel columns and a second of said reel columns;

(d) causing the at least one processor to execute the plurality of instructions to determine if any of said identified symbols for the first reel column are related to any of said identified symbols for the second reel column, wherein each occurrence of related symbols forms a string of related symbols;

(e) for each string of related symbols:

(i) causing the at least one processor to execute the plurality of instructions to determine if any symbols displayed at active symbol positions in an adjacent reel column are related to the symbols which form said string of related symbols, (ii) if one of said symbols in the adjacent reel column is related to the symbols which form said string of related symbols, causing the at least one processor to execute the plurality of instructions to add said related symbol to said string of related symbols, (iii) if any other of said symbols in the adjacent reel column are related to the symbols which form said string of related symbols, causing the at least one processor to execute the plurality of instructions to form an additional string of related symbols for each of the other related symbols, (iv) if none of said symbols in the adjacent reel column are related to the symbols which form said string of related symbols, causing the at least one processor to execute the plurality of instructions to designate said string of related symbols as complete;

(f) causing the at least one processor to execute the plurality of instructions to repeat (e) until either each of the strings of related symbols is complete or there are no additional reel columns adjacent to the last reel column which includes one of the related symbols; and (g) providing to a player any awards based on any strings of related symbols which correspond with any winning combinations of symbols.

41. The method of claim 40, wherein a plurality of probabilities associated with the symbols of at least two reels are different.

42. The method of claim 40, wherein a plurality of probabilities associated with the symbols of at least two reels in at least two different reel columns are different.

43. The method of claim 40, wherein each received wager is associated with substantially the same average expected payout percentage.

44. The method of claim 40, wherein a first wager amount associated with a first number of said reels is non-linearly related to a second wager amount associated with a second number of said reels.

45. The method of claim 40, which is provided through a data network.

46. The method of claim 45, wherein the data network is an internet.

47. A method of operating a gaming device, said method comprising:

(a) receiving a wager associated with a number of reels, said number being greater than one, said reels arranged in a plurality of reel columns, wherein each reel includes a plurality of symbols, at least one of said reel columns includes a plurality of said reels, each reel is adapted to be selectively activated and different wagers are associated with different numbers of reels;

(b) for each wagered on reel, causing at least one processor to execute a plurality of instructions to display one of said symbols of said reel at an active symbol position;

(c) causing the at least one processor to execute the plurality of instructions to identify each of the symbols at active symbol positions for a first of said reel columns and a second of said reel columns;

(d) causing the at least one processor to execute the plurality of instructions to determine if any of said identified symbols for the first reel column and any of said identified symbols for the second reel column are at least part of one of said winning combinations of symbols, wherein each occurrence of symbols which are at least part of one of said winning combinations of symbols forms a string of symbols;

(e) for each string of symbols which forms at least part of one of said winning combinations of symbols:

(i) causing the at least one processor to execute the plurality of instructions to determine if any symbols displayed at active symbol positions in an adjacent reel column and the symbols which form said string of symbols are at least part of one of said winning combinations of symbols, (ii) if one of said symbols in the adjacent reel column and the symbols which form said string of symbols are at least part of one of said winning combinations of symbols, causing the at least one processor to execute the plurality of instructions to add said symbol in the adjacent reel column which are at least part of one of said winning combinations of symbols to said string of symbols, (iii) if any other of said symbols in the adjacent reel column and the symbols which form said string of symbols are at least part of one of said winning combinations of symbols, causing the at least one processor to execute the plurality of instructions to form an additional string of symbols for each of the other symbols which are at least part of one of said winning combinations of symbols, (iv) if none of said symbols in the adjacent reel column and the symbols which form said string of symbols are at least part of one of said winning combinations of symbols, causing the at least one processor to execute the plurality of instructions to designate said string of symbols as complete;

(f) causing the at least one processor to execute the plurality of instructions to repeat (e) until either each of the strings of symbols is complete or there are no additional reel columns adjacent to the last reel column which includes one of the symbols which is at least part of one of said winning combinations of symbols; and (g) providing to a player any awards based on any strings of symbols which correspond with any winning combinations of symbols.

48. The method of claim 47, wherein a plurality of probabilities associated with the symbols of at least two reels are different.

49. The method of claim 47, wherein a plurality of probabilities associated with the symbols of at least two reels in at least two different reel columns are different.

50. The method of claim 47, wherein each received wager is associated with substantially the same average expected payout percentage.

51. The method of claim 47, wherein a first wager amount associated with a first number of said reels is non-linearly related to a second wager amount associated with a second number of said reels.

52. The method of claim 47, which is provided through a data network.

53. The method of claim 52, wherein the data network is an internet.

54. A method of operating a gaming device, said method comprising:

(a) receiving a wager amount greater than one;

(b) causing at least one processor to execute a plurality of instructions to determine a number of a plurality of reels to activate based on said received wager amount, said reels arranged in a plurality of reel columns, wherein each reel includes a plurality of symbols, at least one of said reel columns includes a plurality of said reels, each reel is adapted to be selectively activated and different wager amounts are associated with different numbers of reels to activate;

(c) causing the at least one processor to execute the plurality of instructions to activate each of said determined number of reels;

(d) for each activated reel, causing the at least one processor to execute the plurality of instructions to operate with at least one display device to display one of said symbols of said activated reel at an active symbol position;

(e) causing the at least one processor to execute the plurality of instructions to determine if any of said symbols displayed at any active symbol positions for a requisite number of adjacent reels form a string of related symbols, wherein each formed string of related symbols includes one generated symbol for each reel column and said requisite number of adjacent reels is at least two; and (f) providing to a player any awards based on any determined strings of related symbols.

55. The method of claim 54, wherein a plurality of probabilities associated with the symbols of at least two reels are different.

56. The method of claim 54, wherein a plurality of probabilities associated with the symbols of at least two reels in at least two different reel columns are different.

57. The method of claim 54, wherein each received wager is associated with substantially the same average expected payout percentage.

58. The method of claim 54, wherein a first wager amount associated with a first number of said reels to activate is non-linearly related to a second wager amount associated with a second number of said reels to activate.

59. The method of claim 54, which is provided through a data network.

60. The method of claim 56, wherein the data network is an internet.

61. A method of operating a gaming device, said method comprising:

(a) enabling a player to place one of a plurality of different receivable wager amounts;

(b) causing at least one processor to execute a plurality of instructions to selectively activate a plurality of reels to each generate one of a plurality of symbols at an active symbol position of one of a plurality of reel columns, wherein said activated reels are based on the received wager amounts;

(c) causing the at least one processor to execute the plurality of instructions to determine an award based on any strings of related symbols which are formed from any of the symbols generated at active symbol positions; and (d) providing said determined award to the player.

62. The method of claim 61, wherein a plurality of probabilities associated with the symbols of at least two reels are different.

63. The method of claim 61, wherein a plurality of probabilities associated with the symbols of at least two reels in at least two different reel columns are different.

64. The method of claim 61, wherein each receivable wager amount is associated with substantially the same average expected payout percentage.

65. The method of claim 61, wherein a first of the wager amounts associated with a first number of said reels to activate is non-linearly related to a second of said wager amounts associated with a second number of said reels to activate.

66. The method of claim 61, which is provided through a data network.

67. The method of claim 66, wherein the data network is an internet.

68. A method of operating a gaming device, said method comprising:

(a) receiving a first wager amount or a second wager amount, said first wager amount associated with a first number of a plurality of reels to activate, said second wager amount associated with a second number of said plurality of reels to activate, wherein the second wager amount is greater than the first wager amount and the second number of said reels to activate is greater than and non-linearly related to the first number of said reels to activate;

(b) causing at least one processor to execute a plurality of instructions to selectively activate each of said number of said reels associated with the received wager amount, wherein said reels are arranged in a plurality of reel columns, each reel includes a plurality of symbols, and at least one of said reel columns includes a plurality of said reels;

(c) for each activated reel, causing the at least one processor to execute the plurality of instructions to display one of said symbols of said activated reel at an active symbol position;

(d) causing the at least one processor to execute the plurality of instructions to determine if any of said symbols displayed at any active symbol positions for a requisite number of adjacent reels form a string of related symbols, wherein each formed string of related symbols includes one generated symbol for each reel column and said requisite number of adjacent reels is at least two; and (e) providing to a player any awards based on any determined strings of related symbols.

69. The method of claim 68, wherein a plurality of probabilities associated with the symbols of at least two reels are different.

70. The method of claim 68, wherein a plurality of probabilities associated with the symbols of at least two reels in at least two different reel columns are different.

71. The method of claim 68, wherein each received wager amount is associated with substantially the same average expected payout percentage.

72. The method of claim 68, which is provided through a data network.

73. The method of claim 72, wherein the data network is an internet.

* * * * *

UNITED STATES PATENT AND TRADEMARK OFFICE

CERTIFICATE OF CORRECTION

PATENT NO. : 8,012,011 B2
APPLICATION NO. : 12/045848
DATED : September 6, 2011
INVENTOR(S) : Anthony J. Baerlocher et al.

It is certified that error appears in the above-identified patent and that said Letters Patent is hereby corrected as shown below:

IN THE CLAIMS:

In Claim 1, column 42, line 54, after “symbols,” add --and--.

In Claim 4, column 43, line 6, replace “reel” with --reels--.

In Claim 5, column 43, line 9, replace “reel” with --reels--.

In Claim 6, column 43, line 12, replace “the same” with --a same--.

In Claim 9, column 43, line 57, replace “are” with --is--.

In Claim 9, column 43, line 65, after “symbols,” add --and--.

In Claim 12, column 44, line 20, replace “reel” with --reels--.

In Claim 13, column 44, line 23, replace “reel” with --reels--.

In Claim 14, column 44, line 26, replace “the same” with --a same--.

In Claim 20, column 44, line 67, replace “reel” with --reels--.

In Claim 21, column 45, line 3, replace “reel” with --reels--.

In Claim 22, column 45, line 6, replace “the same” with --a same--.

In Claim 28, column 45, line 44, replace “reel” with --reels--.

In Claim 29, column 45, line 47, replace “reel” with --reels--.

In Claim 30, column 45, line 50, replace “the same” with --a same--.

In Claim 33, column 46, line 4, after “activate;” add --and--.

In Claim 36, column 46, line 33, replace “reel” with --reels--.

In Claim 37, column 46, line 36, replace “reel” with --reels--.

In Claim 38, column 46, line 39, replace “the same” with --a same--.

In Claim 40, column 47, line 15, after “symbols,” add --and--.

In Claim 43, column 47, line 37, replace “the same” with --a same--.

In Claim 47, column 48, line 17, replace “are” with --is--.

Signed and Sealed this
Sixth Day of December, 2011

David J. Kappos
*Director of the United States Patent and Trademark Office*

IN THE CLAIMS:

In Claim 47, column 48, line 27, after “symbols,” add --and--.

In Claim 50, column 48, line 50, replace “the same” with --a same--.

In Claim 57, column 49, line 29, replace “the same” with --a same--.

In Claim 64, column 50, line 2, replace “the same” with --a same--.

In Claim 71, column 50, line 51, replace “the same” with --a same--.